(12) United States Patent
Hsiao

(10) Patent No.: US 12,145,255 B1
(45) Date of Patent: Nov. 19, 2024

(54) HANDLING KIT FOR A FLEXIBLE BAG AND RELATED SYSTEMS AND METHODS

(71) Applicant: Hyperius Biotech Inc., Wellesley, MA (US)

(72) Inventor: Yu-Shun Hsiao, Wellesley, MA (US)

(73) Assignee: Hyperius Biotech Inc., Wellesley, MA (US)

( * ) Notice: Subject to any disclaimer, the term of this patent is extended or adjusted under 35 U.S.C. 154(b) by 0 days.

(21) Appl. No.: 18/642,637

(22) Filed: Apr. 22, 2024

(51) Int. Cl.
| | |
|---|---|
| *B25J 19/02* | (2006.01) |
| *B25J 11/00* | (2006.01) |
| *B25J 15/00* | (2006.01) |
| *B25J 15/04* | (2006.01) |

(52) U.S. Cl.
CPC ......... *B25J 11/005* (2013.01); *B25J 15/0019* (2013.01); *B25J 15/0441* (2013.01); *B25J 19/023* (2013.01)

(58) Field of Classification Search
CPC .... B25J 11/005; B25J 19/023; B25J 15/0019; B25J 15/0441
See application file for complete search history.

(56) References Cited

U.S. PATENT DOCUMENTS

| | | | | |
|---|---|---|---|---|
| 8,226,627 | B2 * | 7/2012 | Fowles | A61J 1/2089 |
| | | | | 604/110 |
| 9,810,363 | B2 * | 11/2017 | Ganzer | B05C 11/1042 |
| 10,500,373 | B2 * | 12/2019 | Barrish | A61M 25/04 |
| 11,980,587 | B2 * | 5/2024 | Wood | A61J 1/2093 |
| 2015/0075625 | A1 * | 3/2015 | Ganzer | B05C 11/1047 |
| | | | | 137/334 |
| 2018/0031163 | A1 * | 2/2018 | Ganzer | B05C 11/1047 |

OTHER PUBLICATIONS

Xie et al., Design of a fully-enclosed disposable bio-micro fluidic cartridge with self-contained reagents for infectious diseases diagnostic applications, 2009, IEEE, p. 1-5 (Year: 2009).*
Moulton, ROV in a Bag- An introduction to Remotely Operated Vehicles (ROVs) for the classroom, 2009, IEEE, p. 1-3 (Year: 2009).*
Gershman et al., Break-the-chain technology for potential Mars sample return, 2018, IEEE, p. 1-21 (Year: 2018).*
Loth et al., Disposable high pressure peristaltic micro pump for standalone and on-chip applications, 2016, IEEE, p. 1-5 (Year: 2016).*

* cited by examiner

*Primary Examiner* — Mcdieunel Marc
(74) *Attorney, Agent, or Firm* — Procopio, Cory, Hargreaves & Savitch LLP

(57) ABSTRACT

A handling kit or system for a flexible liquid bag having a fluid outlet tube to be moved by a moving device and to be cut and welded to a fluid inlet tube of a container by a tube cutting and welding device may include a housing to accept the flexible liquid bag and limit pressure change within the flexible liquid bag in the housing.

30 Claims, 31 Drawing Sheets

HANDLING KIT FOR A FLEXIBLE BAG AND RELATED SYSTEMS AND METHODS

BACKGROUND

Laboratory work can be a fundamental aspect of scientific research and experimentation across various disciplines such as biology, chemistry, physics, engineering, and medicine. It involves conducting experiments, gathering data, and analyzing results in a controlled environment to test hypotheses, validate theories, and advance knowledge in the respective fields. With the advancement of science and technology, lab and preparatory work involving reagents and cleaning solutions in biology, chemistry, and other laboratory settings is increasingly recognized.

SUMMARY

This Summary is provided to introduce a selection of concepts in simplified form that can be further described below in the Detailed Description. This Summary is not intended to identify key aspects or essential aspects of the claimed subject matter.

All features of exemplary embodiments which can be described in this disclosure and can be not mutually exclusive can be combined with one another. Elements of one embodiment can be utilized in the other embodiments without further mention. Other aspects and features of the present invention will become apparent to those ordinarily skilled in the art upon review of the following description of specific embodiments in conjunction with any accompanying Figures.

In some aspects, the techniques described herein relate to a system for a flexible liquid bag having a fluid outlet tube to be moved by a moving device and to be cut and welded to a fluid inlet tube of a container by a tube cutting and welding device, the system including: a moving device including a moving portion; a housing sized to accept the flexible liquid bag in the housing, wherein the housing limits pressure change within the flexible liquid bag in the housing and further includes an attachment portion to attach the housing to the moving device, a docking portion to dock the housing to a platform supporting the tube cutting and welding device, and a tube holding member to hold a proximal portion of the fluid outlet tube to restrict moving of the proximal portion of the fluid outlet tube with respect to the housing; and a tube attachment member to attach to a distal portion of the fluid outlet tube outside the housing, to restrict moving of the distal portion of the fluid outlet tube with respect to the tube attachment member.

In some aspects, the techniques described herein relate to a system, wherein the container contains a live cultured cell.

In some aspects, the techniques described herein relate to a system, wherein the tube cutting and welding device is adapted to cut and weld the fluid outlet tube of the flexible liquid bag and the fluid inlet tube of the container, wherein the fluid outlet tube or the fluid inlet tube are guided by a tube guiding member to guide the fluid outlet tube or the fluid inlet tube to be placed with respect to the cutting and welding device, wherein the tube guiding member includes a wider opening and a narrower tube accommodating portion.

In some aspects, the techniques described herein relate to a system, wherein a portion of the fluid outlet tube in between the proximal and distal portions of the fluid outlet tube is to be cut by the cutting and welding device to expose of a cut portion of the fluid outlet tube connected to the distal portion and to the flexible liquid bag, wherein the cut portion of the fluid outlet tube is to be welded by the cutting and welding device to a tube end of the fluid inlet tube connected to the container to form a welded portion of the fluid outlet tube welded to the fluid inlet tube, wherein the moving portion included in the moving device is to contact the welded portion to increase fluid flow through the welded portion.

In some aspects, the techniques described herein relate to a system, wherein the tube attachment member is to be moved by the moving device to change tension between the proximal portion and the distal portion of the fluid outlet tube.

In some aspects, the techniques described herein relate to a system, wherein the moving portion included in the moving device is to couplable to the tube attachment member, wherein the tube attachment member includes a magnet or a metal piece, or wherein the moving portion included in the moving device includes an electric magnet.

In some aspects, the techniques described herein relate to a system, wherein the moving device further includes a sensor. In some aspects, the techniques described herein relate to a system, wherein the housing includes a cover including a transparent portion, and wherein the sensor is to read information from the flexible liquid bag. In some aspects, the techniques described herein relate to a system, wherein the flexible liquid bag includes a label containing information, and wherein the sensor is to read information from the label, or wherein the flexible liquid bag includes a transparent bag portion, and wherein the sensor is to read information through the transparent bag portion, or wherein the sensor is to read information from the liquid contained in the flexible liquid bag through the transparent bag portion. In some aspects, the techniques described herein relate to a system, wherein the information includes temperature, pH, oxygenation status, or any combination thereof.

In some aspects, the techniques described herein relate to a system, wherein the housing includes a computer-readable indicator, and wherein the sensor is to read information from the computer-readable indicator.

In some aspects, the techniques described herein relate to a system, wherein the information from the computer-readable indicator is to be processed to determine an orientation of the housing with respect to the moving portion included in the moving device or a distance between the sensor and the housing.

In some aspects, the techniques described herein relate to a system, wherein the moving device is a robotic arm, wherein the robotic arm has at least six degrees of freedom.

In some aspects, the techniques described herein relate to a system, wherein the housing further includes a housing receiving portion to receive another docking portion of another housing. In some aspects, the techniques described herein relate to a system, wherein the docking portion is to couple to a housing receiving portion of another housing to couple the housing and the other housing.

In some aspects, the techniques described herein relate to a handling kit for a flexible liquid bag having a fluid outlet tube to be moved by a moving device and to be cut and welded to a fluid inlet tube of a container by a tube cutting and welding device, the handling kit including: a housing sized to accept the flexible liquid bag in the housing, wherein the housing limits pressure change within the flexible liquid bag in the housing and further includes an attachment portion to attach the housing to the moving device, a docking portion to dock the housing to a platform supporting the tube cutting and welding device, and a tube holding member to hold a proximal portion of the fluid outlet tube to restrict moving of the proximal portion of the fluid outlet tube with respect to the housing; and a tube attachment member to attach to a distal portion of the fluid outlet tube outside the housing, to restrict moving of the distal portion of the fluid outlet tube with respect to the tube attachment member.

In some aspects, the techniques described herein relate to a handling kit, wherein the container contains a live cultured cell.

In some aspects, the techniques described herein relate to a handling kit, wherein the tube cutting and welding device is adapted to cut and weld the fluid outlet tube of the flexible liquid bag and the fluid inlet tube of the container, wherein the fluid outlet tube or the fluid inlet tube are guided by a tube guiding member to guide the fluid outlet tube or the fluid inlet tube to be placed with respect to the cutting and welding device, wherein the tube guiding member includes a wider opening and a narrower tube accommodating portion.

In some aspects, the techniques described herein relate to a handling kit, wherein a portion of the fluid outlet tube in between the proximal and distal portions of the fluid outlet tube is to be cut by the cutting and welding device to expose of a cut portion of the fluid outlet tube connected to the distal portion and to the flexible liquid bag, wherein the cut portion of the fluid outlet tube is to be welded by the cutting and welding device to a tube end of the fluid inlet tube connected to the container to form a welded portion of the fluid outlet tube welded to the fluid inlet tube, wherein the moving portion included in the moving device is to contact the welded portion to increase fluid flow through the welded portion.

In some aspects, the techniques described herein relate to a handling kit, wherein the tube attachment member is to be moved by the moving device to change tension between the proximal portion and the distal portion of the fluid outlet tube.

In some aspects, the techniques described herein relate to a handling kit, wherein the moving portion included in the moving device is to couplable to the tube attachment member, wherein the tube attachment member includes a magnet or a metal piece, or wherein the moving portion included in the moving device includes an electric magnet.

In some aspects, the techniques described herein relate to a handling kit, wherein the moving device further includes a sensor. In some aspects, the techniques described herein relate to a handling kit, wherein the sensor is to read information from the flexible liquid bag. In some aspects, the techniques described herein relate to a handling kit, wherein the housing include a cover including a transparent portion, and wherein the sensor is to read information from the flexible liquid bag.

In some aspects, the techniques described herein relate to a handling kit, wherein the flexible liquid bag includes a label containing information, and wherein the sensor is to read information from the label, or wherein the flexible liquid bag includes a transparent bag portion, and wherein the sensor is to read information through the transparent bag portion, or wherein the sensor is to read information from the liquid contained in the flexible liquid bag through the transparent bag portion.

In some aspects, the techniques described herein relate to a handling kit, wherein the information includes temperature, pH, oxygenation status, or any combination thereof.

In some aspects, the techniques described herein relate to a handling kit, wherein the housing includes a computer-readable indicator, and wherein the sensor is to read information from the computer-readable indicator.

In some aspects, the techniques described herein relate to a handling kit, wherein the information from the computer-readable indicator is to be processed to determine an orientation of the housing with respect to the moving portion included in the moving device or a distance between the sensor and the housing.

In some aspects, the techniques described herein relate to a handling kit, wherein the moving device is a robotic arm, wherein the robotic arm has at least six degrees of freedom.

In some aspects, the techniques described herein relate to a handling kit, wherein the housing further includes a housing receiving portion to receive another docking portion of another housing, wherein the docking portion is to couple to a housing receiving portion of another housing to couple the housing and the other housing.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification.

BRIEF DESCRIPTION OF THE DRAWING

It is to be expressly understood that the drawings are for the purpose of illustration and description only and are not intended as a definition of the limits of the invention.

Referring to FIG. 33 B, in some embodiments, the robotic arm using the attached operation structure module opens a cover of the tube sliding slots of the cutting and welding device.

DETAILED DESCRIPTION

Figure 1:
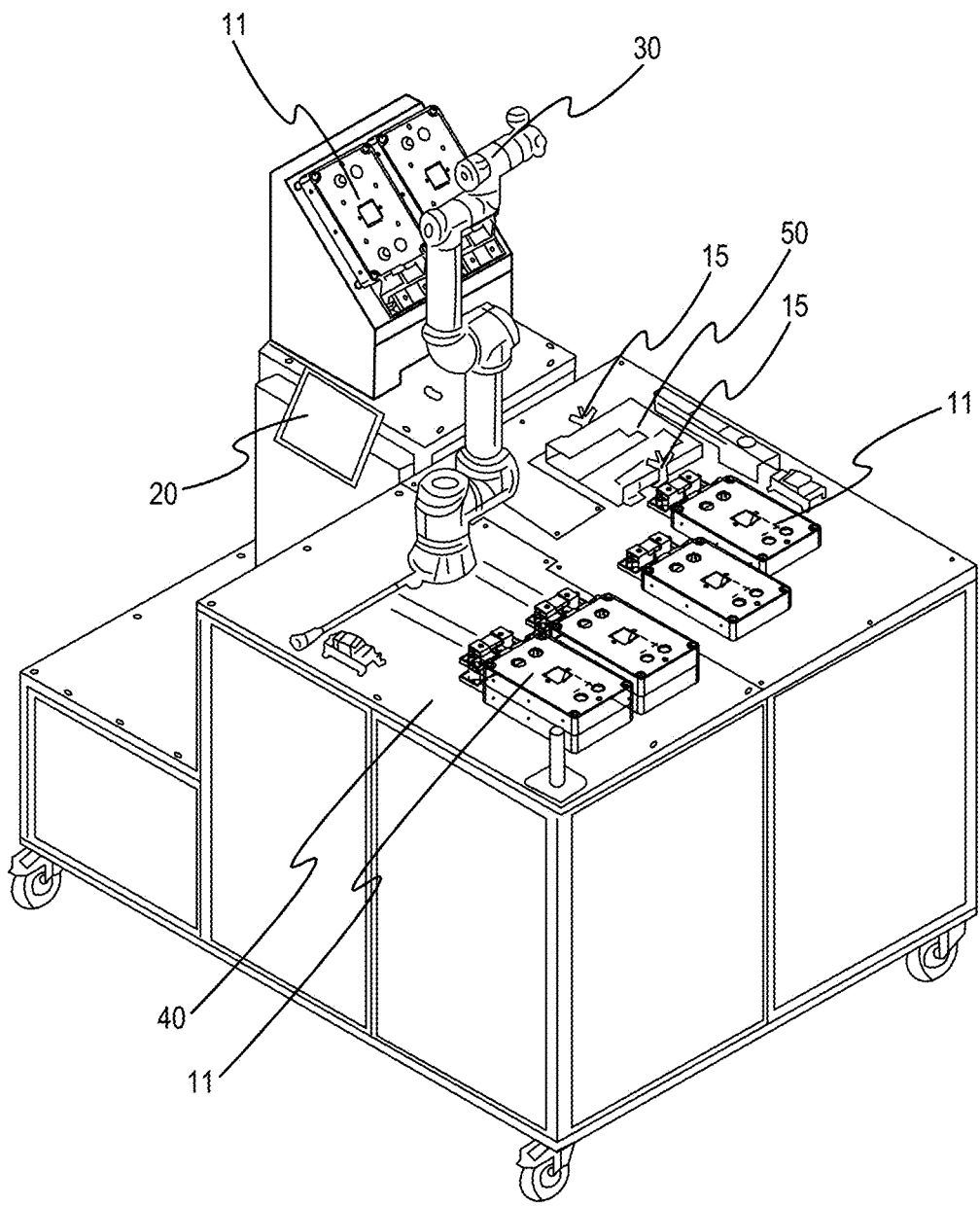
FIG. 1 illustrates a system 100 for a cell culture in some embodiments.

Hereinafter, the present disclosure will be described in detail. Prior to the description, it should be understood that the terms or words used in the specification and the appended claims should not be construed as limited to general and dictionary meanings, but rather interpreted based on the meanings and concepts corresponding to the technical aspects of the present disclosure on the basis of the principle that the inventor is allowed to define terms appropriately for the best explanation. Therefore, the embodiments described herein and the elements shown in the drawings is just a most preferred embodiment of the present disclosure, but not intended to fully describe the technical aspects of the present disclosure, so it should be understood that other equivalents and modifications could have been made thereto at the time the application was filed.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The terms "about" and "essentially" are used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure.

"A and/or B" when used in this specification, specifies "either A or B or both".

As used herein, the terms proximal and distal in the context of the apparatus refer to proximal and distal as referenced from the apparatus outside an object, such that proximal may refer to components outside the object and distal may refer to components inside the object or attached to the object, or on a surface of the object.

The present disclosure recognizes that there's a growing demand for precision and speed in preparing and conducting lab work. In some embodiments, incubators play a role in nurturing microbiological and cell cultures derived from biological samples for research and analysis across various domains. In some embodiments, these incubators can be essentially insulated chambers designed to regulate key environmental parameters, such as temperature and humidity, to create an optimal setting for maintaining sample viability and facilitating microbial growth. Moreover, they can incorporate mechanisms to control the atmospheric composition within the chamber, including the levels of carbon dioxide and oxygen.

In some embodiments, the maintenance of the controlled environment may demand care and labor when handling samples. Moreover, prolonged exposure of samples to laboratory conditions, such as during imaging processes, can disrupt microbial growth or expose specimens to contaminants, jeopardizing the reliability of assay outcomes.

In some embodiments, there is a demand for monitoring and maintaining systems that not only ensure the integrity of the incubator's controlled atmosphere but also streamline the handling of cultured specimens with minimal operator involvement. Efforts to improve the management of plated cultures within incubators are crucial for preserving experimental accuracy and enhancing productivity in research and analysis endeavors.

For example, flexible liquid bags are commonly used in various industries for storing and transporting liquids, including sensitive substances such as a solution with functional proteins or live cultured cells. Proper handling and management of these bags during transportation and usage are crucial to maintain the integrity of the contained liquids and ensure their safe delivery and application.

With the advancement of science and technology, the significance of preparatory work involving reagents and cleaning solutions in biology, chemistry, and other laboratory settings is increasingly recognized. Consequently, there's a growing demand for precision and speed in in laboratory work such as preparing and replacing solutions. Many experiments require a liquid preparation module to create standard solutions with varying concentrations, involving tasks such as needle tube cleaning, solvent handling, sample rinsing, liquid separation, dilution, and more.

In some embodiments, an automated system or solution for exchanging fluid transport bags in the cell culture process can be provided. In some embodiments, automating the entire cell culture process and aiming to reduce manual labor in the cell culture factory can be provided.

In some embodiments, AI-based feedback check can be implemented. In some embodiments, AI image analysis will be employed to perform the precision of the bag replacement process and to provide real-time system feedback. In some embodiments, a database to log operational data for monitoring and improving system performance can be implemented.

In some aspects, the present disclosure relates to a handling kit for a flexible liquid bag having a fluid outlet tube to be moved by a moving device and to be cut and welded to a fluid inlet tube of a container by a tube cutting and welding device, the handling kit including: a housing sized to accept the flexible liquid bag in the housing, wherein the housing limits pressure change within the flexible liquid bag in the housing and further includes an attachment portion to attach the housing to the moving device, a docking portion to dock the housing to a platform supporting the tube cutting and welding device, and a tube holding member to hold a proximal portion of the fluid outlet tube to restrict moving of the proximal portion of the fluid outlet tube with respect to the housing; and a tube attachment member to attach to a distal portion of the fluid outlet tube outside the housing, to restrict moving of the distal portion of the fluid outlet tube with respect to the tube attachment member.

In some aspects, the present disclosure relates to a handling kit, wherein the container contains a live cultured cell. In some aspects, the present disclosure relates to a handling kit, wherein the tube cutting and welding device is adapted to cut and weld the fluid outlet tube of the flexible liquid bag and the fluid inlet tube of the container. In some aspects, the present disclosure relates to a handling kit, wherein the fluid outlet tube or the fluid inlet tube are guided by a tube guiding member to guide the fluid outlet tube or the fluid inlet tube to be placed with respect to the cutting and welding device.

In some aspects, the present disclosure relates to a handling kit, wherein the tube guiding member includes a wider opening and a narrower tube accommodating portion. In some aspects, the present disclosure relates to a handling kit, wherein a portion of the fluid outlet tube in between the proximal and distal portions of the fluid outlet tube is to be cut by the cutting and welding device to expose of a cut portion of the fluid outlet tube connected to the distal portion and to the flexible liquid bag. In some aspects, the present disclosure relates to a handling kit, wherein the cut portion of the fluid outlet tube is to be shifted by the cutting and welding device to be aligned with a tube end of the fluid inlet tube to be welded to the tube end.

In some aspects, the present disclosure relates to a handling kit, wherein the cut portion of the fluid outlet tube is to be welded by the cutting and welding device to a tube end of the fluid inlet tube connected to the container to form a welded portion of the fluid outlet tube welded to the fluid inlet tube. In some aspects, the present disclosure relates to a handling kit, wherein the moving portion included in the moving device is to contact the welded portion to increase fluid flow through the welded portion. In some aspects, the present disclosure relates to a handling kit, wherein the welded portion is to be pushed by the moving portion included in the moving device.

In some aspects, the present disclosure relates to a handling kit, wherein the welded portion is to be roll-milled by the moving portion included in the moving device. In some aspects, the present disclosure relates to a handling kit, wherein the tube attachment member coupled to the distal portion of the fluid outlet tube is to be moved to change tension of the fluid outlet tube in between the proximal and distal portions of the fluid outlet tube when the tube holding portion is coupled to the proximal portion of the fluid outlet tube. In some aspects, the present disclosure relates to a handling kit, wherein the tube attachment member is to be moved by the moving device to change tension between the proximal portion and the distal portion of the fluid outlet tube. In some aspects, the present disclosure relates to a handling kit, wherein the moving portion included in the moving device is to couple to the tube attachment member.

In some aspects, the present disclosure relates to a handling kit, wherein the moving device is to move the housing with less than 1 millimeter precision. In some aspects, the present disclosure relates to a handling kit, wherein the docking portion includes a magnet or a metal piece. In some aspects, the present disclosure relates to a handling kit, wherein the tube attachment member includes a magnet or a metal piece. In some aspects, the present disclosure relates to a handling kit, wherein the moving portion included in the moving device includes an electric magnet. In some aspects, the present disclosure relates to a handling kit, wherein the moving device further includes a sensor. In some aspects, the present disclosure relates to a handling kit, wherein the sensor is to read information from the flexible liquid bag. In some aspects, the present disclosure relates to a handling kit, wherein the housing include a cover including a transparent portion, and wherein the sensor is to read information from the flexible liquid bag. In some aspects, the present disclosure relates to a handling kit, wherein the housing including a cover including a transparent portion, and wherein the sensor is to read information from the flexible liquid bag through the transparent portion.

In some aspects, the present disclosure relates to a handling kit, wherein the flexible liquid bag includes a label containing information, and wherein the sensor is to read information from the label. In some aspects, the present disclosure relates to a handling kit, wherein the flexible liquid bag includes a transparent bag portion, and wherein the sensor is to read information through the transparent bag portion. In some aspects, the present disclosure relates to a handling kit, wherein the sensor is to read information from the liquid contained in the flexible liquid bag through the transparent bag portion. In some aspects, the present disclosure relates to a handling kit, wherein the information includes temperature, pH, oxygenation status, or any combination thereof.

In some aspects, the present disclosure relates to a handling kit, wherein the housing includes a computer-readable indicator, and wherein the sensor is to read information from the computer-readable indicator. In some aspects, the present disclosure relates to a handling kit, wherein the computer-readable indicator includes a computer readable code. In some aspects, the present disclosure relates to a handling kit, wherein the computer readable code includes AprilTags, a bar code, a QR code, or a combination thereof. In some aspects, the present disclosure relates to a handling kit, wherein the information from the computer-readable indicator is to be processed to determine an orientation of the housing with respect to the moving portion included in the moving device or a distance between the sensor and the housing.

In some aspects, the present disclosure relates to a handling kit, wherein the moving device is a robotic arm. In some aspects, the present disclosure relates to a handling kit, wherein the robotic arm has at least six degrees of freedom. In some aspects, the present disclosure relates to a handling kit, wherein the robotic arm is an UR5e robotic arm.

In some aspects, the present disclosure relates to a handling kit, wherein the platform includes a receiving portion to receive the docking portion on a surface of the platform. In some aspects, the present disclosure relates to a handling kit, wherein the receiving portion includes a surface recess. In some aspects, the present disclosure relates to a handling kit, wherein the housing further includes a housing receiving portion to receive another docking portion of another housing. In some aspects, the present disclosure relates to a handling kit, wherein the housing receiving portion includes a surface recess. In some aspects, the present disclosure relates to a handling kit, wherein the docking portion is to couple to a housing receiving portion of another housing to couple the housing and the other housing. In some aspects, the present disclosure relates to a handling kit, wherein the docking portion is to couple to a housing receiving portion of another housing to stack the housing and the other housing.

In some aspects, the present disclosure relates to a system for a flexible liquid bag having a fluid outlet tube to be moved by a moving device and to be cut and welded to a fluid inlet tube of a container by a tube cutting and welding device, the system including: a moving device including a moving portion; a housing sized to accept the flexible liquid bag in the housing, wherein the housing limits pressure change within the flexible liquid bag in the housing and further includes an attachment portion to attach the housing to the moving device, a docking portion to dock the housing to a platform supporting the tube cutting and welding device, and a tube holding member to hold a proximal portion of the fluid outlet tube to restrict moving of the proximal portion of the fluid outlet tube with respect to the housing; and a tube attachment member to attach to a distal portion of the fluid outlet tube outside the housing, to restrict moving of the distal portion of the fluid outlet tube with respect to the tube attachment member.

In some aspects, the present disclosure relates to a system, wherein the container contains a live cultured cell. In some aspects, the present disclosure relates to a system, wherein the tube cutting and welding device is adapted to cut and weld the fluid outlet tube of the flexible liquid bag and the fluid inlet tube of the container. In some aspects, the present disclosure relates to a system, wherein the fluid outlet tube or the fluid inlet tube are guided by a tube guiding member to guide the fluid outlet tube or the fluid inlet tube to be placed with respect to the cutting and welding device. In some aspects, the present disclosure relates to a system, wherein the tube guiding member includes a wider opening and a narrower tube accommodating portion. In some aspects, the present disclosure relates to a system, wherein a portion of the fluid outlet tube in between the proximal and distal portions of the fluid outlet tube is to be cut by the cutting and welding device to expose of a cut portion of the fluid outlet tube connected to the distal portion and to the flexible liquid bag. In some aspects, the present disclosure relates to a system, wherein the cut portion of the fluid outlet tube is to be shifted by the cutting and welding device to be aligned with a tube end of the fluid inlet tube to be welded to the tube end. In some aspects, the present disclosure relates to a system, wherein the cut portion of the fluid outlet tube is to be welded by the cutting and welding device to a tube end of the fluid inlet tube connected to the container to form a welded portion of the fluid outlet tube welded to the fluid inlet tube.

In some aspects, the present disclosure relates to a system, wherein the moving portion included in the moving device is to contact the welded portion to increase fluid flow through the welded portion. In some aspects, the present disclosure relates to a system, wherein the welded portion is to be pushed by the moving portion included in the moving device. In some aspects, the present disclosure relates to a system, wherein the welded portion is to be roll-milled by the moving portion included in the moving device. In some aspects, the present disclosure relates to a system, wherein the tube attachment member coupled to the distal portion of the fluid outlet tube is to be moved to change tension of the fluid outlet tube in between the proximal and distal portions of the fluid outlet tube when the tube holding portion is coupled to the proximal portion of the fluid outlet tube. In some aspects, the present disclosure relates to a system, wherein the tube attachment member is to be moved by the moving device to change tension between the proximal portion and the distal portion of the fluid outlet tube. In some aspects, the present disclosure relates to a system, wherein the moving portion included in the moving device is to couple to the tube attachment member.

In some aspects, the present disclosure relates to a system, wherein the moving device is to move the housing with less than 1 millimeter precision. In some aspects, the present disclosure relates to a system, wherein the docking portion includes a magnet or a metal piece. In some aspects, the present disclosure relates to a system, wherein the tube attachment member includes a magnet or a metal piece. In some aspects, the present disclosure relates to a system, wherein the moving portion included in the moving device includes an electric magnet. In some aspects, the present disclosure relates to a system, wherein the moving device further includes a sensor. In some aspects, the present disclosure relates to a system, wherein the sensor is to read information from the flexible liquid bag. In some aspects, the present disclosure relates to a system, wherein the housing includes a cover including a transparent portion, and wherein the sensor is to read information from the flexible liquid bag.

In some aspects, the present disclosure relates to a system, wherein the flexible liquid bag includes a label containing information, and wherein the sensor is to read information from the label. In some aspects, the present disclosure relates to a system, wherein the flexible liquid bag includes a transparent bag portion, and wherein the sensor is to read information through the transparent bag portion. In some aspects, the present disclosure relates to a system, wherein the sensor is to read information from the liquid contained in the flexible liquid bag through the transparent bag portion. In some aspects, the present disclosure relates to a system, wherein the information includes temperature, pH, oxygenation status, or any combination thereof. In some aspects, the present disclosure relates to a system, wherein the housing includes a computer-readable indicator, and wherein the sensor is to read information from the computer-readable indicator. In some aspects, the present disclosure relates to a system, wherein the computer-readable indicator includes a computer readable code. In some aspects, the present disclosure relates to a system, wherein the computer readable code includes AprilTags, a bar code, a QR code, or a combination thereof.

In some aspects, the present disclosure relates to a system, wherein the information from the computer-readable indicator is to be processed to determine an orientation of the housing with respect to the moving portion included in the moving device or a distance between the sensor and the housing. In some aspects, the present disclosure relates to a system, wherein the moving device is a robotic arm. In some aspects, the present disclosure relates to a system, wherein the robotic arm has at least six degrees of freedom. In some aspects, the present disclosure relates to a system, wherein the robotic arm is an UR5e robotic arm.

In some aspects, the present disclosure relates to a system, wherein the platform includes a receiving portion to receive the docking portion on a surface of the platform. In some aspects, the present disclosure relates to a system, wherein the receiving portion includes a surface recess. In some aspects, the present disclosure relates to a system, wherein the housing further includes a housing receiving portion to receive another docking portion of another housing. In some aspects, the present disclosure relates to a system, wherein the housing receiving portion includes a surface recess. In some aspects, the present disclosure relates to a system, wherein the docking portion is to couple to a housing receiving portion of another housing to couple the housing and the other housing. In some aspects, the present disclosure relates to a system, wherein the docking portion is to couple to a housing receiving portion of another housing to stack the housing and the other housing.

The present disclosure relates to a handling kit for a flexible liquid bag having a fluid outlet tube to be moved by a moving device and to be cut and welded to a fluid inlet tube of a container by a tube cutting and/or welding device and a tube attachment member to attach to a distal portion of the tube outside the housing, to restrict moving of the distal portion of the tube with respect to the tube attachment member. In some embodiment, the handling kit can comprise a housing comprising a base and a cover to house the flexible liquid bag in between the base and the cover to limit pressure change within the flexible liquid bag in the housing. In some embodiments, the housing can further comprise an attachment portion to attach the housing to the moving device, a docking portion to dock the housing to a platform supporting the tube cutting and/or welding device, and a tube holding member to hold a proximal portion of the tube to restrict moving of the proximal portion of the tube with respect to the housing. In some embodiments, the container contains a live cultured cell.

In some embodiments, the handling kit or system can aim to provide efficient and reliable management of flexible liquid bags. In some embodiments, the kit comprises a housing designed to accommodate a flexible liquid bag, along with features for attachment to a moving device, docking to a platform supporting a tube cutting and/or welding device, and holding the fluid outlet tube of the bag.

The system may incorporate different types of devices. For example, the system may include a moving device equipped with a robotic arm capable of interacting with the housing and other components of the kit. For example, a tube cutting and welding device may be employed to process the fluid outlet tube of the flexible bag, enabling seamless integration with a container's fluid inlet tube.

In some embodiments, a moving device which can involve various mechanisms such as multi-joint mechanical arms or multi-degree-of-freedom industrial robots find different applications across various industrial sectors such as electronics, logistics, chemical industry, and detection analysis. In some embodiments, most robots are designed for specific tasks or functions, with each robot being equipped with its own mechanical arm and control system tailored to perform fixed functions like processing, manufacturing, carrying, and circulation.

In some embodiments, an automated solution or system for exchanging fluid transport bags in the cell culture process can be provided. In some embodiments, an automated solution or system may utilize a moving device such as robotic arm. For example, an automated solution or system may utilize a moving device. The system may incorporate different types of devices. For example, the system may include a moving device equipped with a robotic arm capable of interacting with the housing and other components of the kit. For example, a tube cutting and welding device may be employed to process the fluid outlet tube of the flexible bag, enabling seamless integration with a container's fluid inlet tube. For example, a 6-DoF robotic arm combined with AI image analysis to perform replacement of various components, such as a tube replacement for fluid transport bags and place them in the correct position on top of the cell culture machine. In some embodiments, Optical Character Recognition (OCR) functions as a pivotal component in automatically extracting and interpreting text information displayed on screens or surfaces of machines and equipment. The process entails several key steps. Firstly, in image acquisition, cameras capture images of the machine screens/surfaces containing text. Subsequently, preprocessing techniques such as grayscale conversion, binarization, and noise removal enhance image quality. Following this, text detection algorithms like MSER and MSCR localize the regions containing text in the image. Character segmentation then separates the text regions into individual characters or words. Finally, an OCR engine, trained on diverse fonts/styles, recognizes the segmented characters. In some embodiments, several key parameters govern the OCR process, including image resolution and quality, the choice of OCR engine (e.g., Tesseract, Google Vision), language models and dictionaries, confidence thresholds, and object detection. In some embodiments, regarding object detection, various approaches can be employed to recognize objects such as nozzles, valves, tube openings, and buttons on machines/equipment. In some embodiments, these include utilizing pre-trained YOLO models like YOLOv3 and YOLOv4, the Segment Anything Model (SAM) developed by Meta (Facebook AI Research), and Vision Transformers (ViT) like DeIT and BEiT. In some embodiments, these models leverage convolutional neural networks, transformer-based architectures, and attention mechanisms over image patches to accurately identify objects. In some embodiments, in the general object detection pipeline, images or videos are first captured from cameras, then a suitable model such as YOLO, SAM, or ViT is selected, and the images are run through the chosen model for inference. Post-processing techniques, including confidence thresholds and segmentation, are applied to filter objects. In some embodiments, across object detection models, key parameters include input image resolution, confidence thresholds, non-max suppression parameters, the number of classes (e.g., nozzle, valve), and pre-trained weights for transfer learning. In some embodiments, these OCR and object detection components collaborate to facilitate automated monitoring, data extraction, and analysis for the machines/equipment covered under this patent. In some embodiments, the selection of deployed models is based on considerations such as accuracy, speed, and hardware constraints.

In some embodiments, a remote-control solution to control the cell culture machine and start or pause the cell expansion process can be provided.

In some embodiments, a handling kit can be provided for a flexible liquid bag having a fluid outlet tube to be moved by a moving device and to be cut and welded to a fluid inlet tube of a container by a tube cutting and/or welding device and a tube attachment member to attach to a distal portion of the tube outside the housing, to restrict moving of the distal portion of the tube with respect to the tube attachment member. In some embodiment, the handling kit can comprise a housing comprising a base and a cover to house the flexible liquid bag in between the base and the cover to limit pressure change within the flexible liquid bag in the housing. In some embodiments, the housing can further comprise an attachment portion to attach the housing to the moving device, a docking portion to dock the housing to a platform supporting the tube cutting and/or welding device, and a tube holding member to hold a proximal portion of the tube to restrict moving of the proximal portion of the tube with respect to the housing. In some embodiments, the container contains a live cultured cell.

In some embodiments, a system can be provided for a flexible liquid bag having a fluid outlet tube to be moved by a moving device and to be cut and welded to a fluid inlet tube of a container by a tube cutting and/or welding device. In some embodiments, the system can comprise a moving device including a moving portion, a housing comprising a base and a cover to house the flexible liquid bag in between the base and the cover to limit a pressure change within the flexible liquid bag in the housing, and a tube attachment member to attach to a distal portion of the tube outside the housing, to restrict moving of the distal portion of the tube with respect to the tube attachment member. In some embodiments, the housing can further comprise an attachment portion to attach the housing to the moving device, a docking portion to dock the housing to a platform supporting the tube cutting and/or welding device, and a tube holding member to hold a proximal portion of the tube to restrict moving of the proximal portion of the tube with respect to the housing. In some embodiments, the container contains a live cultured cell.

In some embodiments, the tube cutting and welding device can be adapted to cut and weld the fluid outlet tube of the flexible liquid bag and the fluid inlet tube of the container. In some embodiments, the tube cutting and welding device can be a single device adapted to cut and weld the fluid outlet tube of the flexible liquid bag and the fluid inlet tube of the container. In some embodiments, the tube cutting and welding device can be a plurality of devices adapted to cut and weld the fluid outlet tube of the flexible liquid bag and the fluid inlet tube of the container.

In some embodiments, a portion of the fluid outlet tube in between the proximal and distal portions of the fluid outlet tube can be to be cut by the cutting and welding device to expose of a cut portion of the fluid outlet tube connected to the distal portion and to the flexible liquid bag.

In some embodiments, the cut portion of the fluid outlet tube can be to be shifted by the cutting and welding device to be aligned with a tube end of the fluid inlet tube to be welded to the tube end. In some embodiments, the cut portion of the fluid outlet tube can be to be welded by the cutting and welding device to a tube end of the fluid inlet tube connected to the container to form a welded portion of the fluid outlet tube welded to the fluid inlet tube.

In some embodiments, the moving portion included in the moving device can be to contact the welded portion to increase fluid flow through the welded portion. In some embodiments, the welded portion can be to be pushed by the moving portion included in the moving device. In some embodiments, the welded portion can be to be roll-milled by the moving portion included in the moving device.

In some embodiments, the tube attachment member coupled to the distal portion of the tube can be move to change tension of the tube in between the proximal and distal portions of the tube when the tube holding portion can be coupled to the proximal portion of the tube. In some embodiments, the tube attachment member can be to be moved by the moving device to change the tension between the first and distal portions of the tube. In some embodiments, the moving portion included in the moving device can be to couple to the tube attachment member. In some embodiments, the moving device can be to move the housing with less than 1 millimeter precision.

In some embodiments, the docking portion may include a magnet or a metal piece. In some embodiments, the tube attachment member may include a magnet or a metal piece. In some embodiments, the moving portion included in the moving device may include an electric magnet.

In some embodiments, the moving device may further comprise a sensor. In some embodiments, the sensor can be to read information from the flexible liquid bag. In some embodiments, the cover may include a transparent portion, and wherein the sensor can be to read information from the flexible liquid bag. In some embodiments, the flexible liquid bag may comprise a label containing information, and wherein the sensor can be to read information from the label. In some embodiments, the flexible liquid bag may include a transparent bag portion, and wherein the sensor can be to read information through the transparent bag portion.

In some embodiments, the sensor can be to read information from the liquid contained in the flexible liquid bag through the transparent bag portion. In some embodiments, the information may include temperature, pH, oxygenation status, or any combination thereof. In some embodiments, the housing may comprise a computer-readable indicator, and wherein the sensor can be to read information from the computer-readable indicator. In some embodiments, the computer-readable indicator may include a computer readable code. In some embodiments, the computer readable code may include a bar code or a QR code. In some embodiments, the information from the computer-readable indicator can be to be processed to determine an orientation of the housing with respect to the moving portion included in the moving device or a distance between the sensor and the housing.

In some embodiments, the moving device can be a robotic arm. In some embodiments, the robotic arm may have at least six degrees of freedom. In some embodiments, the robotic arm can be an UR5e robotic arm.

In some embodiments, the platform may comprise a receiving portion to receive the docking portion on a surface of the platform. In some embodiments, the receiving portion may include a surface recess. In some embodiments, the housing may further comprise a housing receiving portion. In some embodiments, the housing receiving portion may include a surface recess. In some embodiments, the docking portion can be to couple to a housing receiving portion of another housing to couple the housing and the other housing. In some embodiments, the docking portion can be to couple to a housing receiving portion of another housing to stack the housing and the other housing.

FIG. 1 illustrates a system 100 for a cell culture in some embodiments. Referring to FIG. 1, in some embodiments, the system 100 may comprises a moving device 30 to move a housing 10 that may house a flexible liquid bag 11, a user interface 20, cutting and/or welding device 50, etc. In some embodiments, a machine platform 40 can be provided, for example, to include or accommodate a component of the system 100 such as the moving device 20, housing 10, liquid bag 11, a user interface 20, cutting and/or welding device 50, etc. In some embodiments, the robotic arm 30 can be UR 5e. In some embodiments, a moving device 30 may include a moving portion 35. In some embodiments, the robotic arm 30 can have a moving portion 35 as an effectuating end of the robotic arm 30. In some embodiments, the robotic arm 30 can have an attaching member 33 which may include an attaching structure module 35 as a moving portion 35. In some embodiments, an attaching structure module can be in various shapes and structures, such as a cube shape. In some embodiments, the robotic arm 30 can include a sensor 37, which could be selected from a various types of sensors, such as a camera. For example, in some embodiments, as a sensor 37, different types of cameras, such as 2D camera or 3D camera can be used. In some embodiments, a machine platform 40 can be a variety of different types of platform, such as a two dimensionally arranged platform or three dimensionally arranged platform. For example, in some embodiments, a machine platform 40 can be a panel or table top or a surface such as a top surface. In some embodiments, a machine platform 40 can include various structures, components, mechanism or installments. For example, a machine platform 40 can include various types of holding structures 45 such pipe fixing aids 451 around a cutting and/or welding device 50 for pressing, a cutting and/or welding device holding structure 452, an attaching structure module holding structure 453, a user interface holding structure 454. In some embodiments, various types of holding structures 45 may include various types of mechanism or sub-structures, such as different mechanical couplers and a magnet and its magnet-based holding structures. In some embodiments, the user interface 10 can be based on different types of interface, controllers, and algorithm. For example, the user interface may include a screen or display, mechanical or physical keys, a touch screen, and can be operated based on different types of applications such as LINUX and MICROSOFT WINDOWS.

In some embodiments, the robotic arm 30 can be UR 5e. In some embodiments, the robotic arm 30 can have an attaching member 33 which may include an attaching structure module 35. In some embodiments, an attaching structure module 35 can be in various shapes and structures, such as a cube shape. In some embodiments, the robotic arm 30 can move an object with a precise control. For example, the robotic arm 30 can move an object such as the housing 11 with less than 1 millimeter precision.

Figure 2:
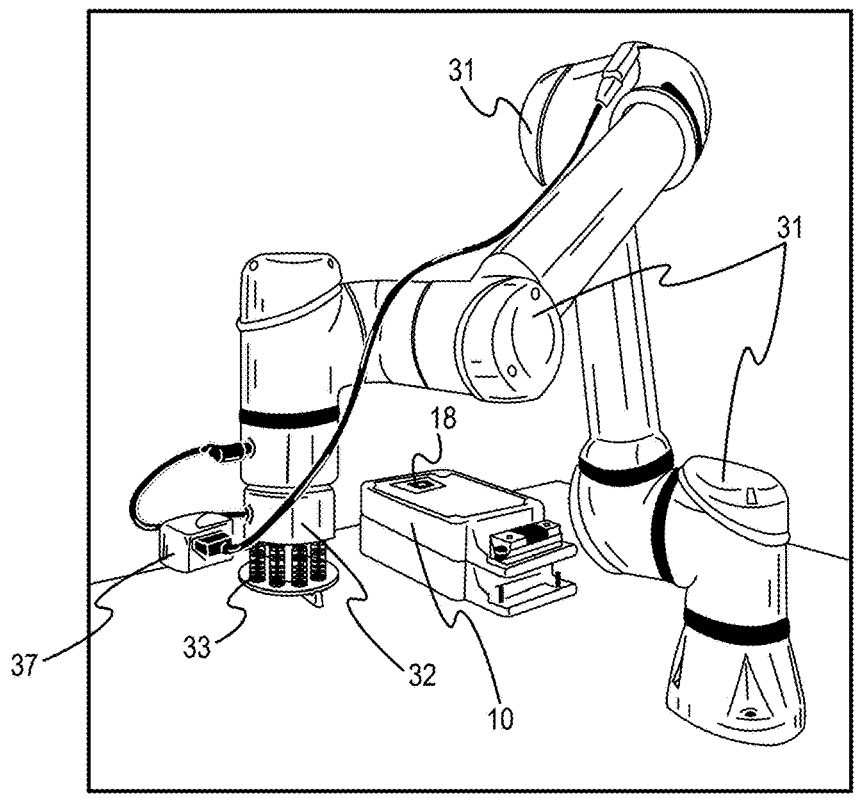
FIG. 2 illustrates an aspect of an example robotic arm as a moving device in some embodiments.
Figure 3:
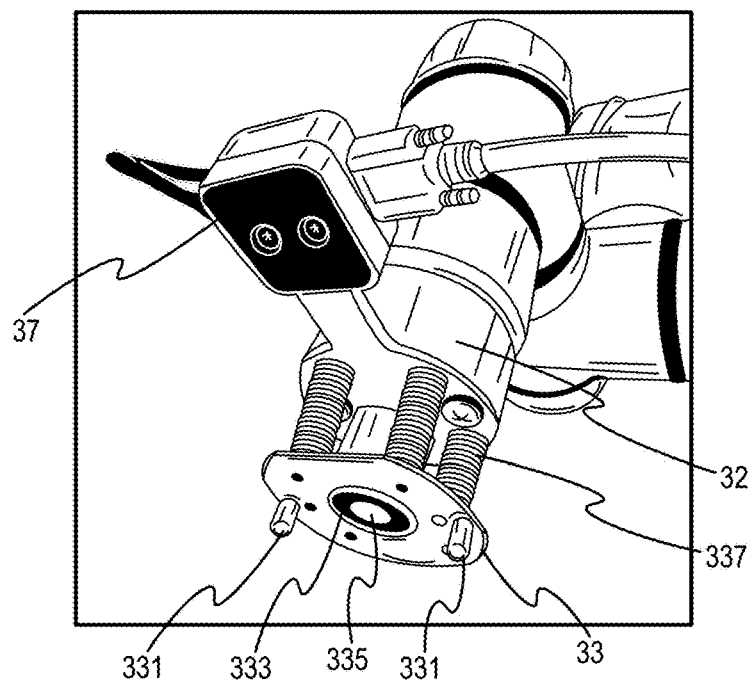
FIG. 3 illustrates an aspect of an example robotic arm as a moving device having an attaching member 33 in some embodiments.

For example, FIG. 2 illustrates an aspect of an example robotic arm 30 as a moving device coupled to a platform 40 in some embodiments. FIG. 3 illustrates an aspect of an example robotic arm 30 as a moving device 30 having an attaching member 33 in some embodiments. Referring FIGS. 2 and 3, in some embodiments, the robotic arm 30 may include a plurality of joints 31 to allow a different degree of freedom of motion. In some embodiments, the robotic arm 30 has at least two degrees of freedom. In some embodiments, the robotic arm 30 has at least three degrees of freedom. In some embodiments, the robotic arm 30 has at least four degrees of freedom. In some embodiments, the robotic arm 30 has at least five degrees of freedom. In some embodiments, the robotic arm 30 has at least six degrees of freedom. In some embodiments, the robotic arm 30 has at least seven degrees of freedom. In some embodiments, the robotic arm 30 has at least eight degrees of freedom. In some embodiments, the robotic arm 30 has at least nine degrees of freedom. In some embodiments, the robotic arm 30 has at least ten degrees of freedom.

In some embodiments, the robotic arm 30 can include a sensor 37, which could be selected from a various types of sensors, such as a camera. For example, in some embodiments, as a sensor 37, different types of cameras, such as 2D camera or 3D camera can be used. In some embodiments, the sensor 37 can obtain various information from the surrounding it is sensing and process the various information for operation of the robotic arm 30. For example, in some embodiments, the sensor 37 can obtain various information from the surrounding it is sensing and process the various information to determine an orientation of the housing 11 with respect to the attaching member 33 or attaching structure module 35 included in the robotic arm 30 or a distance between the sensor 37 and the housing 11.

In some embodiments, the sensor is to read information from the housing 11 or the flexible liquid bag 12. In some embodiments, the housing 11 may include a cover 13 that includes a transparent portion 131, and wherein the sensor is to read information from the flexible liquid bag 11. In some embodiments, the flexible liquid bag 11 can comprise a label containing information, and wherein the sensor 37 is to read information from the label. In some embodiments, the flexible liquid bag 11 includes a transparent bag portion, and wherein the sensor 37 can read information through the transparent bag portion. In some embodiments, the sensor 37 is to read information from the liquid contained in the flexible liquid bag 11 through the transparent bag portion. In some embodiments, the information includes temperature, pH, oxygenation status, or any combination thereof. In some embodiments, the housing 11 comprises a computer-readable indicator 18, and wherein the sensor 37 is to read information from the computer-readable indicator 18. In some embodiments, the computer-readable indicator 18 may include a computer readable code. In some embodiments, the computer readable code 18 can includes bar code or a QR code. In some embodiments, the information from the computer-readable indicator 18 is to be processed to determine an orientation of the housing 11 with respect to the attaching member 33 or attaching structure module 35 included in the robotic arm 30 or a distance between the sensor 37 and the housing 11.

In some embodiments, the robotic arm 30 may include an end effector arm 32. In some embodiments, the robotic arm 30 may include an attaching member 33 that can be connected to or coupled to the end effector arm 32. In some embodiments, the attaching member 33 is configured to be attached to an object such as a housing 11 to hold or move the object based on motion of the arm. In some embodiments, an attaching member 33 may include a various attaching medium such as a suction member 333, an electromagnet 355, etc., and a combination thereof. In some embodiments, an attaching member 33 may include a guiding member 331, such as a guiding protrusion, a guiding recess, a guiding slot and guiding pin, which is to guide the attachment of the attaching member 33 to an object such as housing 11 and other structures and components.

Referring to FIGS. 1 and 2, in some embodiments, a platform 40, which may be a chest, container, a panel, other various structures, or any combination to provide one or more surfaces to accommodate various structures and devices.

Figure 4:
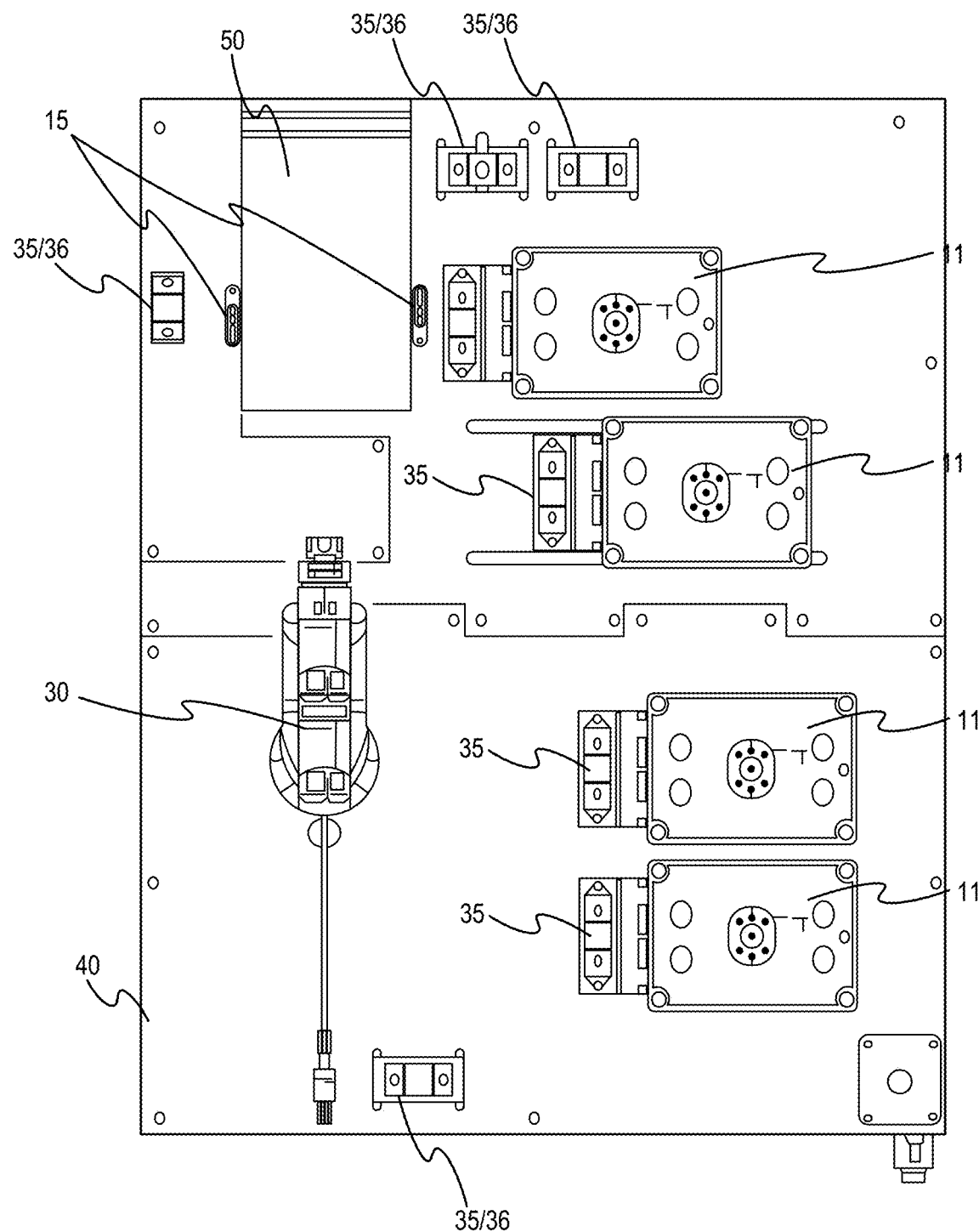
FIG. 4 illustrates an aspect of an example platform for an operation of a moving device in some embodiments.

FIG. 4 illustrates an aspect of an example platform for an operation of a moving device in some embodiments. Referring to FIG. 4, the platform provides a surface to which the robotic arm 30, the housing 11 can be accommodated or coupled to. In some embodiments, the platform can also accommodate other various parts, devices and components, such as various structure modules 35 and various holders 36 for accommodating various structure modules 35 that can be couplable or attachable to the attaching member, for example, by having a metal piece 351 or magnet piece 351 to which the electromagnet 355 of the attaching member 33 can be attracted toward or attachable to, a flat surface portion to which the suction member can be attachable to, a guiding member accommodating portion 353 to which the guiding member 331 can be inserted or accommodated, or a combination thereof. In some embodiments, the platform can also accommodate other various parts, such as a tube guiding member 15.

In some embodiments, an attaching structure module 35 may have various structures. For example, in some embodiments, an attaching structure module 35 may include a guiding member accommodating portion 353 that can guide engagement of the moving device 30 with the attaching structure module 35 or attachment of the moving device 30 to the attaching structure module 35, for example, via a moving portion 33 such as an attaching member 33. In some embodiments, attaching structure may include various shapes, materials, structures, a combination thereof, depending on their functions or operations.

Figure 5:
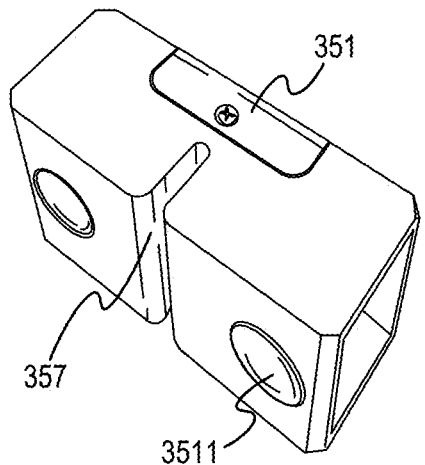
FIG. 5 illustrates an aspect of an example attaching structure module, which is a tube or pipe holding structure, which is attachable to an attaching member, in some embodiments.
Figure 6:
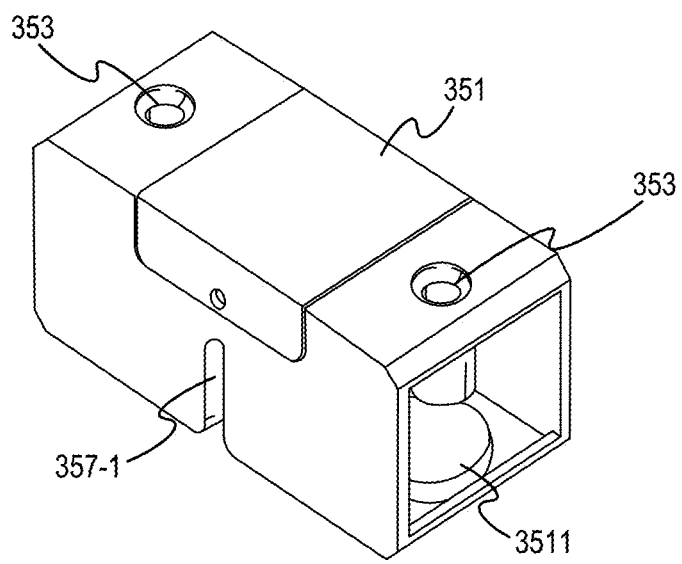
FIG. 6 illustrates an aspect of an example attaching structure module, which is a tube or pipe holding structure, which is attachable to an attaching member, in some embodiments.
Figure 15:
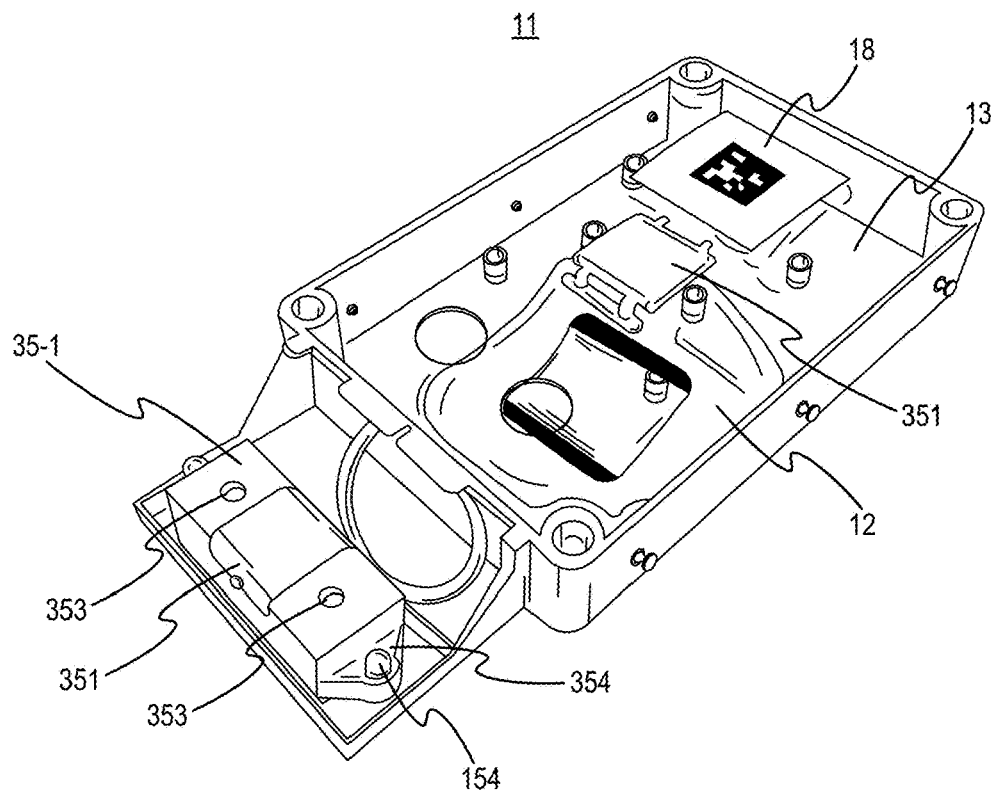
FIG. 15 illustrates an internal aspect of a housing in some embodiments.
Figure 16:
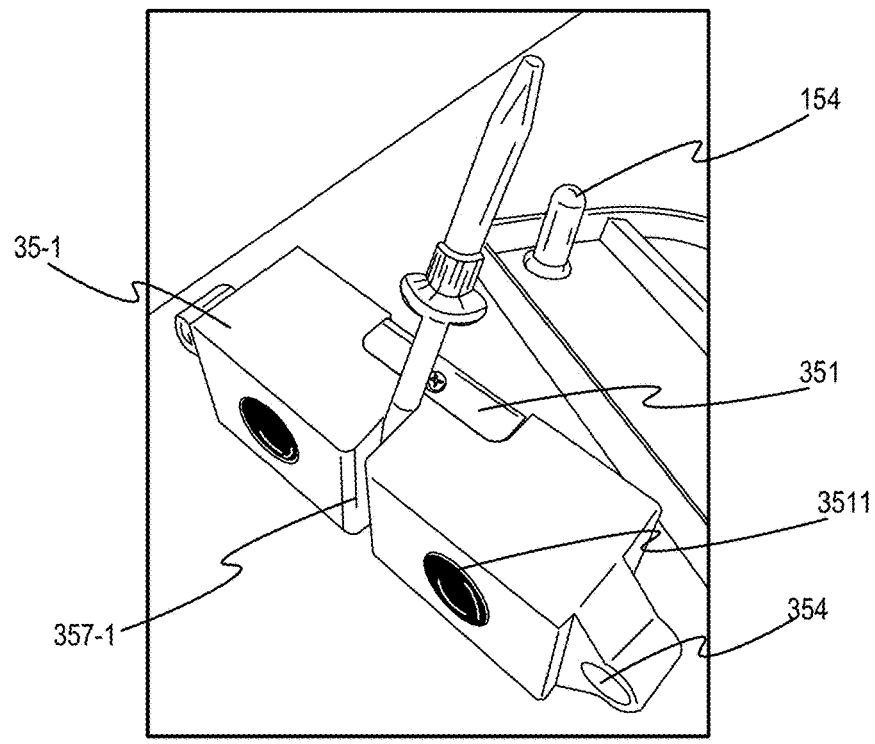
FIG. 16 illustrates a tube attachment member 35-1, which can be an attaching structure module and can be a tube or pipe holding structure module, including a tube or pipe holding structure coupled with a tube for holding the tube in some embodiments.

FIGS. 5 and 6 and illustrate an aspect of an example attaching structure module 35, which is a tube or pipe holding structure module 35-1, which can be used as a tube attachment member 35-1, and which is attachable to an attaching member 33, in some embodiments. FIG. 16 illustrates a tube attachment member 35-1, which can be an attaching structure module 53 and can be a tube or pipe holding structure module, including a tube or pipe holding structure 357-1 coupled with a tube for holding the tube in some embodiments. Referring to FIGS. 5 and 6, the tube or pipe holding structure module 35-1 as a tube attachment member 35-1 may include a metal piece 351 or magnet piece 351 to which the electromagnet 355 of the attaching member 33 can be attracted toward or attachable to, a flat surface portion to which the suction member can be attachable to, a guiding member accommodating portion 353 to which the guiding member 331 can be inserted or accommodated, or a combination thereof. In some embodiments, the tube or pipe holding structure module 35-1 as a tube attachment member 35-1 may include a second attaching portion 3511 such as a second metal piece 3511 or second magnet piece 3511 that can attach the attachment member to another portion, such as a surface of the platform 40 to which, for example, the magnet piece 3511 can be attracted toward or attachable to, a flat surface portion to which the suction member can be attachable to, a guiding member accommodating portion 353 to which the guiding member 331 can be inserted or accommodated, or a combination thereof. In some embodiments, the tube or pipe holding structure module 35-1 as a tube attachment member 35-1 may include a tube holding portion 357-1 to which the tube can be slid in or can be held to move the tube or change a tension of the tube. In some embodiments, the tube or pipe holding structure module 35-1 or the tube holding portion 357-1 is to be moved by the moving device to change the tension between the first and distal portions of the tube. In some embodiments, referring to FIGS. 15-16, the tube or pipe holding structure module 35-1 as a tube attachment member 35-1 may include a guiding portion 354 to guide the tube or pipe holding structure module 35-1 as a tube attachment member 35-1 to be accommodated into a guiding receiving portion 154 of the housing, for example, to selectively couple the tube or pipe holding structure module 35-1 to the housing.

Figure 7:
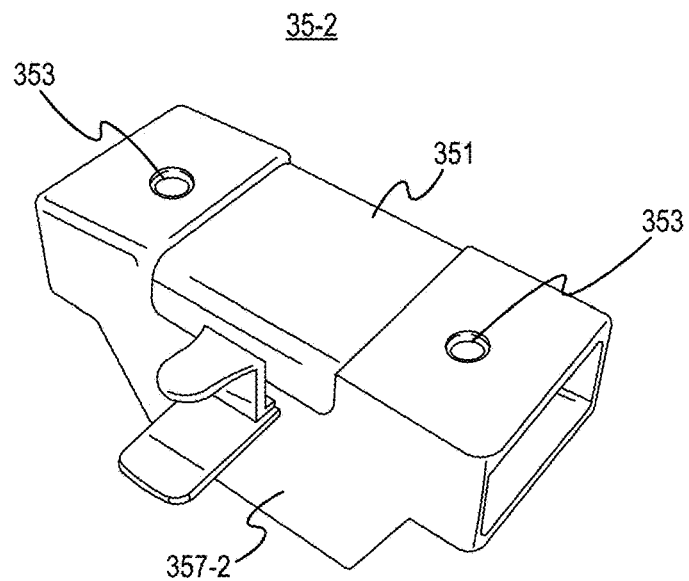
FIG. 7 illustrates an aspect of an example attaching structure module, which is an operation structure module usable for operating a cutting and/or welding device, which is attachable to an attaching member, in some embodiments.
Figure 8:
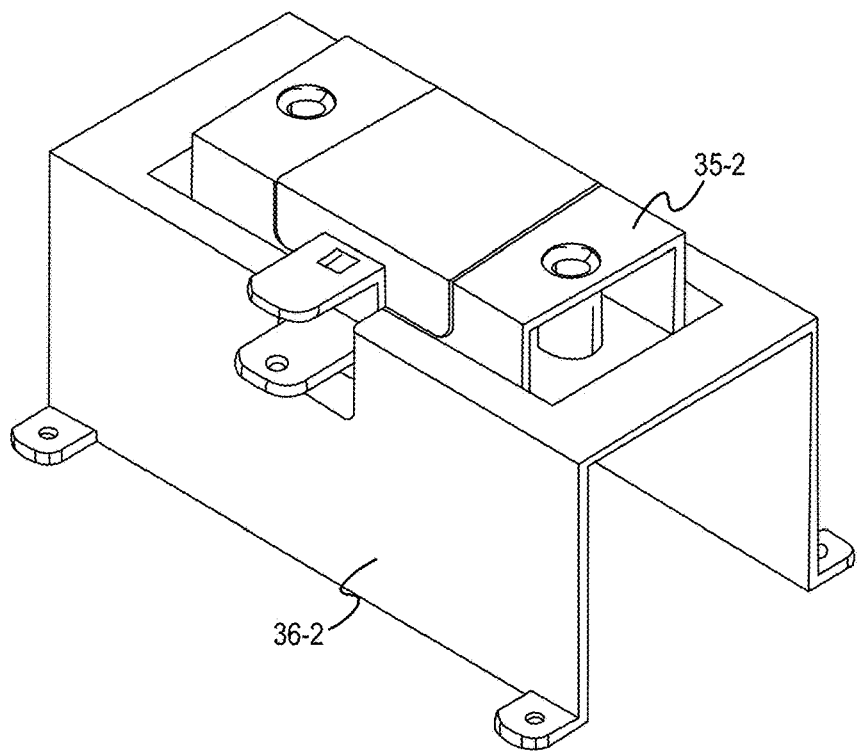
FIG. 8 illustrates an aspect of an example attaching structure module holder, which to accommodate an operation structure module for a cutting and/or welding device, which is attachable to an attaching member, in some embodiments.

FIG. 7 illustrates an aspect of an example attaching structure module 35, which is an operation structure module 35-2 usable for different operations, such as moving an object such as a housing 11 and operating different devices such as operating a cutting and/or welding device, which is attachable to an attaching member 33, in some embodiments. Referring to FIG. 7, the operation structure module 35-2 may include a metal piece 351 or magnet piece 351 to which the electromagnet 355 of the attaching member 33 can be attracted toward or attachable to, a flat surface portion to which the suction member can be attachable to, a guiding member accommodating portion 353 to which the guiding member 331 can be inserted or accommodated, or a combination thereof. In some embodiments, the operation structure module 35-2 may include a press portion 357-2 in which the tube can be pressed with. In some embodiments, the operation structure module 35-2 is to be moved by the moving device to push or roll the welded tube or clogged tube to open the tube. FIG. 8 illustrates an aspect of an example attaching structure module holder 36, which is an operation structure module holder 36-2 to accommodate an operation structure module 35-2 for a cutting and/or welding device, which is attachable to an attaching member 33, in some embodiments. In some embodiments, the operation structure module holder 36-2 can accommodate the operation structure module 35-2

Figure 9:
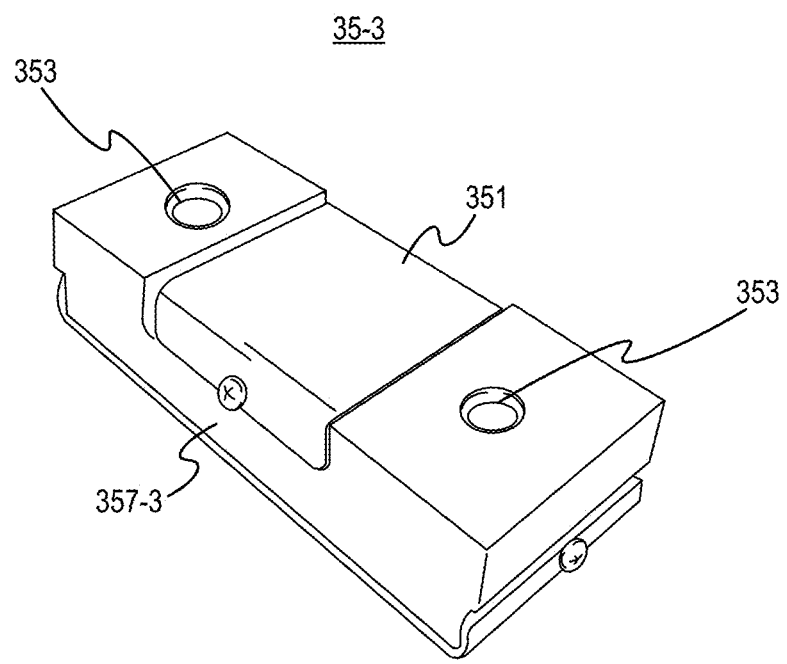
FIG. 9 illustrates an aspect of an example attaching structure module, which is a tube or pipe pressing structure, which is attachable to an attaching member, in some embodiments.
Figure 10:
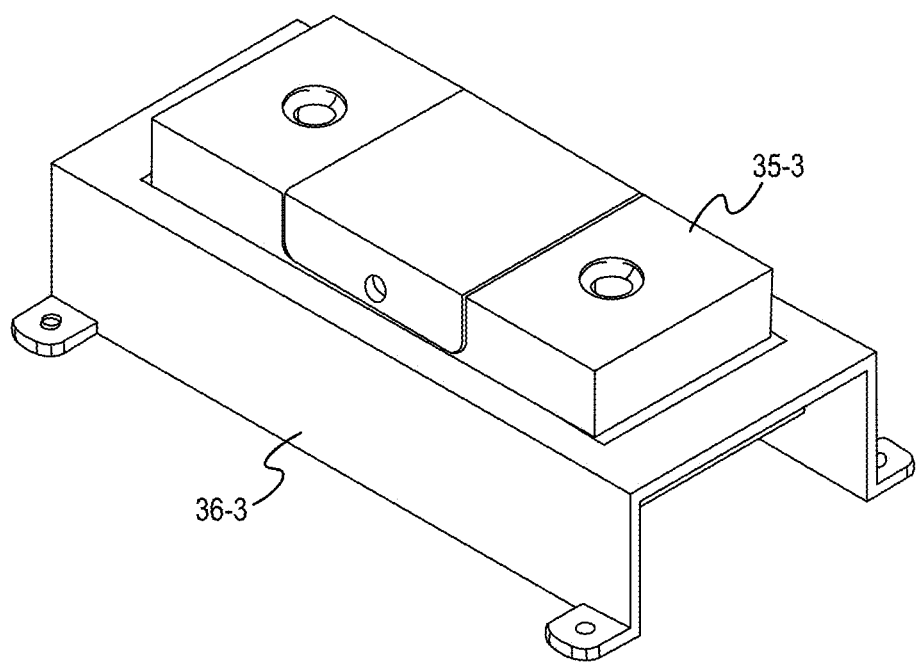
FIG. 10 illustrates an aspect of an example attaching structure module holder, which is to accommodate a tube or pipe pressing structure, which is attachable to an attaching member, in some embodiments.

FIG. 9 illustrates an aspect of an example attaching structure module 35, which includes a tube or pipe pressing structure module 35-3, which is attachable to an attaching member 33, in some embodiments. Referring to FIG. 9, the pipe pressing structure module 35-3 may include a metal piece 351 or magnet piece 351 to which the electromagnet 355 of the attaching member 33 can be attracted toward or attachable to, a flat surface portion to which the suction member can be attachable to, a guiding member accommodating portion 353 to which the guiding member 331 can be inserted or accommodated, or a combination thereof. In some embodiments, the pipe pressing structure module 35-3 may include a press portion 357-3 in which the tube can be pressed with. In some embodiments, the press portion 357 may include a soft or flexible material to add tensile buffer or flexible portion, for example, to mimic soft or flexible portion such as a person's hand. In some embodiments, the tube pressing structure module 35-3 is to be moved by the moving device to push or roll the welded tube or clogged tube to open the tube. FIG. 10 illustrates an aspect of an example attaching structure module holder 36, which is a tube pressing structure module holder 36-3 to accommodate a tube pressing structure module 35-3 for a cutting and/or welding device, which is attachable to an attaching member 33, in some embodiments. In some embodiments, the operation structure module holder 36-2 can accommodate the operation structure module 35-2

Figure 11:
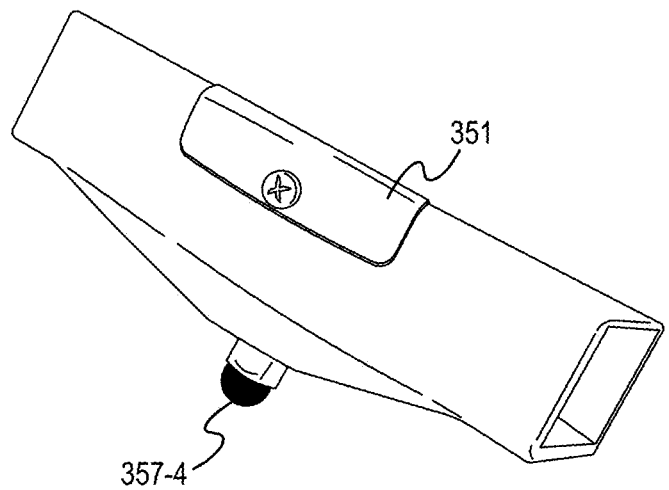
FIG. 11 illustrates an aspect of an example attaching structure module, which is a screen touch structure, which is attachable to an attaching member, in some embodiments.
Figure 12:
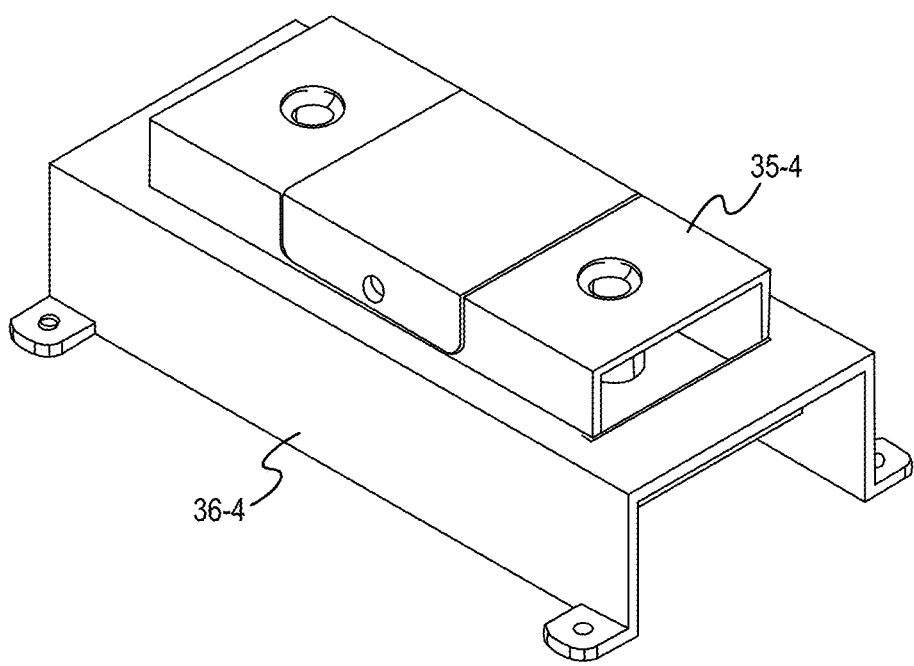
FIG. 12 illustrates an aspect of an example attaching structure module holder, which is to hold a screen touch structure, in some embodiments.

FIG. 11 illustrates an aspect of an example attaching structure module 35, which is a screen touch structure module 35-4 with the screen touch portion 357-4, which is attachable to an attaching member 44, in some embodiments. FIG. 12 illustrates an aspect of an example attaching structure module holder 35, which can hold a screen touch structure module 357-4, in some embodiments.

Figure 13:
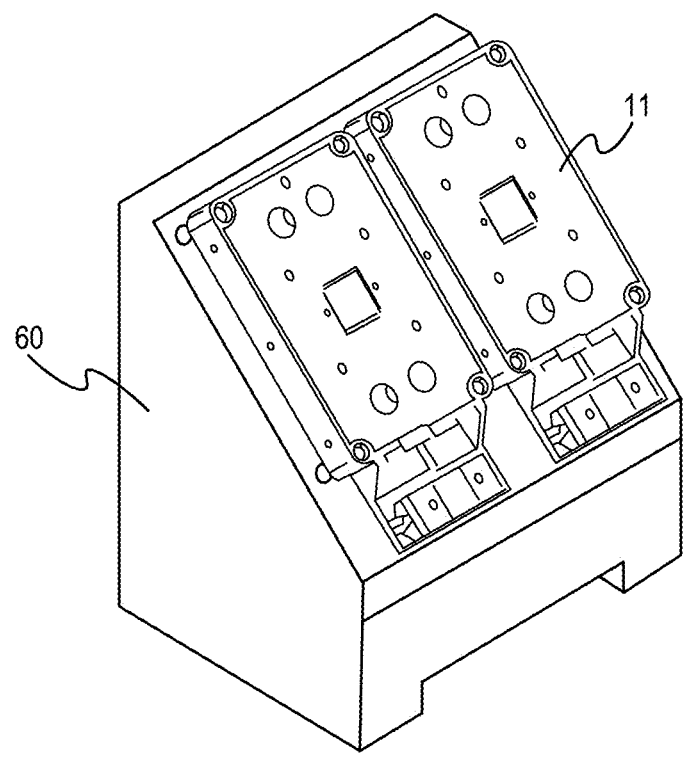
FIG. 13 illustrates an aspect of an example housing holder as part of an operating platform in some embodiments.

FIG. 13 illustrates an aspect of an example housing holder 60 as part of an operating platform 40 in some embodiments. Referring to FIG. 13, the housing holder 60 will hold the flexible bag in a higher location, to supply the liquid or solution inside the flexible bag by gravity.

Figure 14:
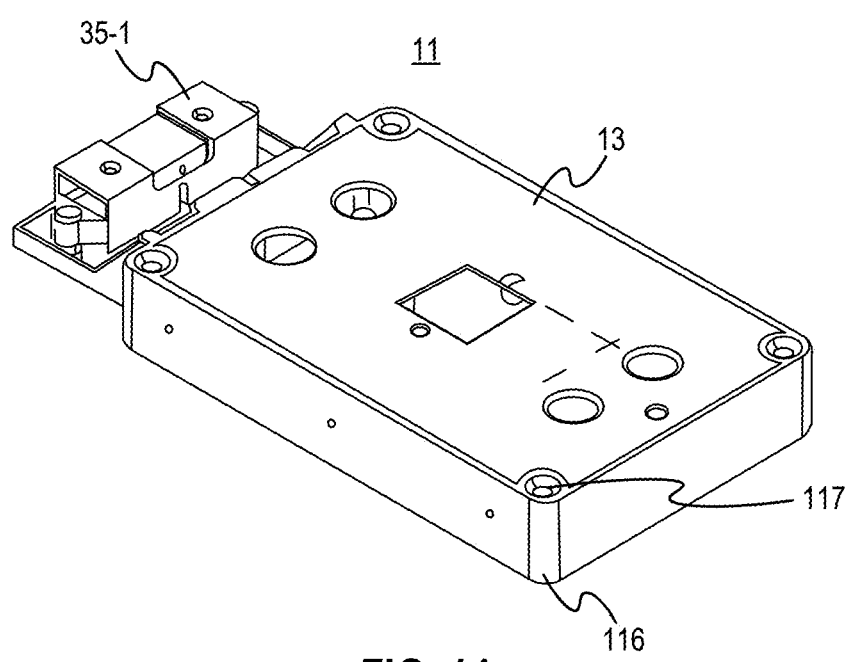
FIG. 14 illustrates an aspect of a housing in some embodiments.
Figure 17:
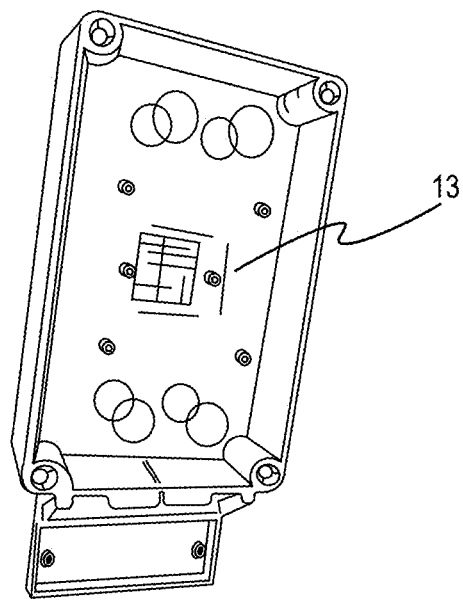
FIG. 17 illustrates an aspect of a housing 11 including a transparent cover 13 in some embodiments.

FIG. 14 illustrates an aspect of a housing 11 in some embodiments. FIG. 15 illustrates an aspect of a housing 11 in some embodiments. FIG. 16 illustrates a tube attachment member 35-1, which can be an attaching structure module 53 and can be a tube or pipe holding structure module, including a tube or pipe holding structure 357-1 coupled with a tube for holding the tube in some embodiments. attaching structure module. FIG. 17 illustrates an aspect of a housing 11 including a transparent cover 13 in some embodiments. Referring to FIGS. 14-17, in some embodiments, a housing 11 may include a base 111 and a cover 13 to house the flexible liquid bag in between the base 111 and the cover 13 to limit a pressure change within the flexible liquid bag in the housing 11. In some embodiments, the housing 11 can further comprises a housing receiving portion 117. In some embodiments, the housing receiving portion 117 may include a surface recess. In some embodiments, the docking portion 116 is to couple to a housing receiving portion 117 of another housing 11 to couple the housing 11 and the other housing 11. In some embodiments, the docking portion 116 is to couple to a housing receiving portion 117 of another housing 11 to stack the housing 11 and the other housing 11. In some embodiments, referring to FIGS. 15-16, the tube or pipe holding structure module 35-1 as a tube attachment member 35-1 may include a guiding portion 354 to guide the tube or pipe holding structure module 35-1 as a tube attachment member 35-1 to be accommodated into a guiding receiving portion 154 of the housing, for example, to selectively couple the tube or pipe holding structure module 35-1 to the housing.

In some embodiments, the housing 11 may include a cover 13 that includes a transparent portion 131, and wherein the sensor is to read information from the flexible liquid bag 11. In some embodiments, the flexible liquid bag 11 can comprise a label containing information, and wherein the sensor 37 is to read information from the label. In some embodiments, the flexible liquid bag 11 includes a transparent bag portion, and wherein the sensor 37 can read information through the transparent bag portion. In some embodiments, the sensor 37 is to read information from the liquid contained in the flexible liquid bag 11 through the transparent bag portion. In some embodiments, the information includes temperature, pH, oxygenation status, or any combination thereof. In some embodiments, the housing 11 comprises a computer-readable indicator 18, and wherein the sensor 37 is to read information from the computer-readable indicator 18. In some embodiments, the computer-readable indicator 18 may include a computer readable code.

In some embodiments, the computer readable code 18 can includes bar code or a QR code. In some embodiments, the information from the computer-readable indicator 18 is to be processed to determine an orientation of the housing 11 with respect to the attaching member 33 or attaching structure module 35 included in the robotic arm 30 or a distance between the sensor 37 and the housing 11.

Figure 18:
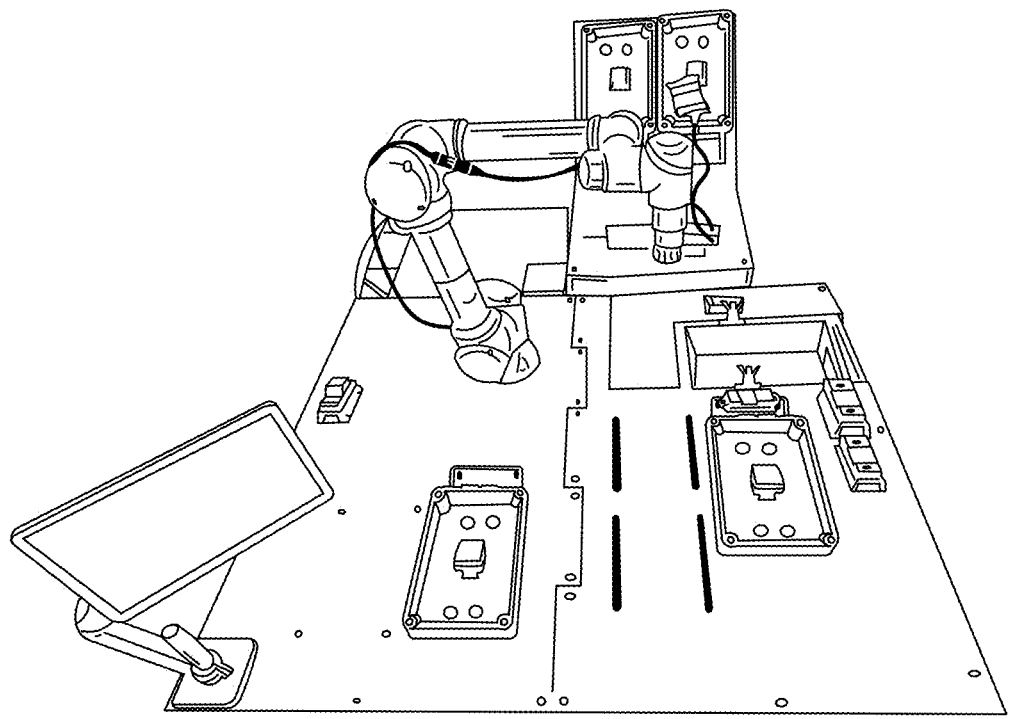
FIG. 18 illustrates an aspect of a platform arranged with robotic arm as a moving device and a housing including a transparent cover in some embodiments.
Figure 19:
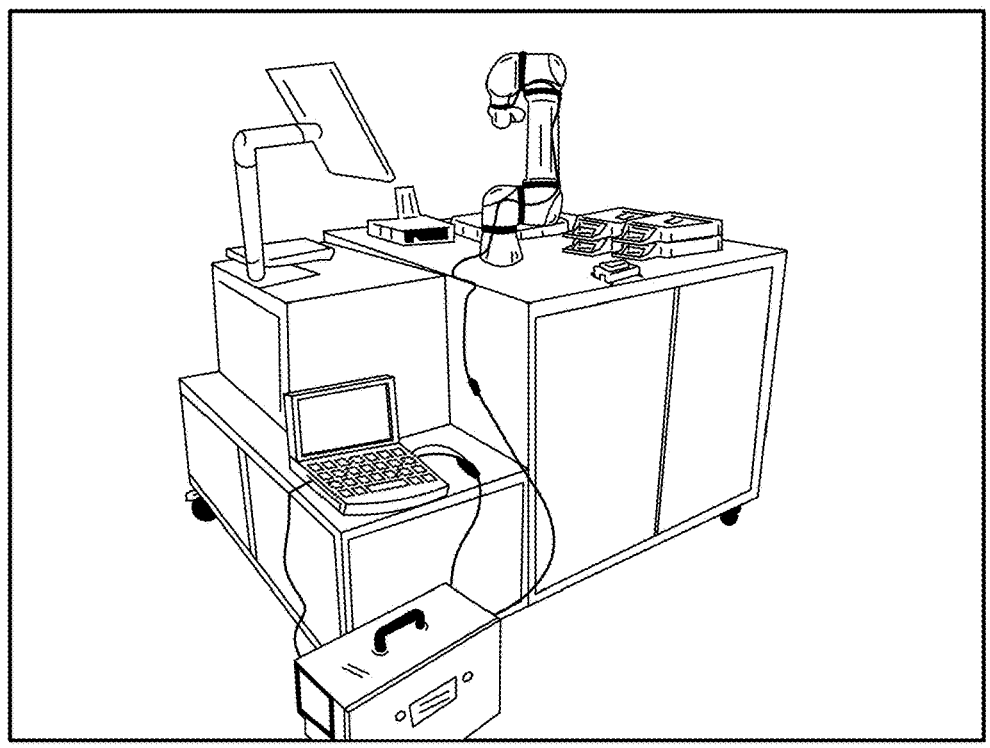
FIG. 19 illustrates an aspect of a system including a platform arranged with robotic arm as a moving device and a housing including a transparent cover in some embodiments.
Figure 20:
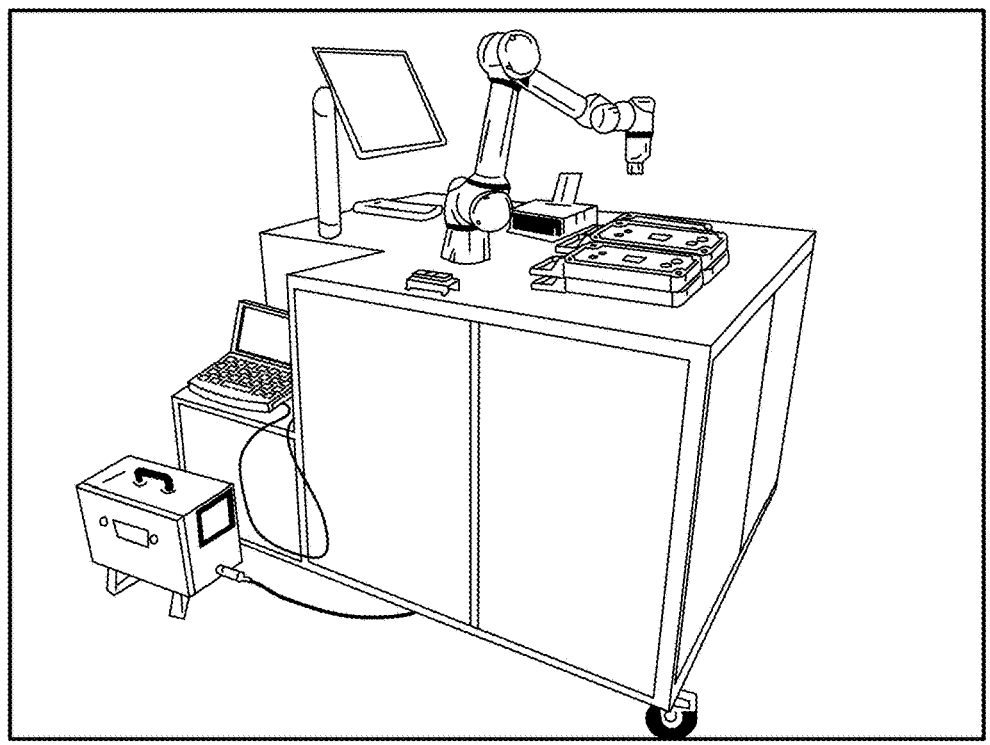
FIG. 20 illustrates an aspect of a system including a platform arranged with robotic arm as a moving device and a housing including a transparent cover in some embodiments.

FIG. 18 illustrates an aspect of a platform 40 arranged with robotic arm 30 as a moving device 30 and a housing 11 including a transparent cover in some embodiments. FIG. 19 illustrates an aspect of a system 100 including a platform 40 arranged with robotic arm 30 as a moving device 30 and a housing 11 including a transparent cover 13 in some embodiments. FIG. 20 illustrates an aspect of a system 100 including a platform 40 arranged with robotic arm 30 as a moving device 30 and a housing 11 including a transparent cover 13 in some embodiments.

Figure 21:
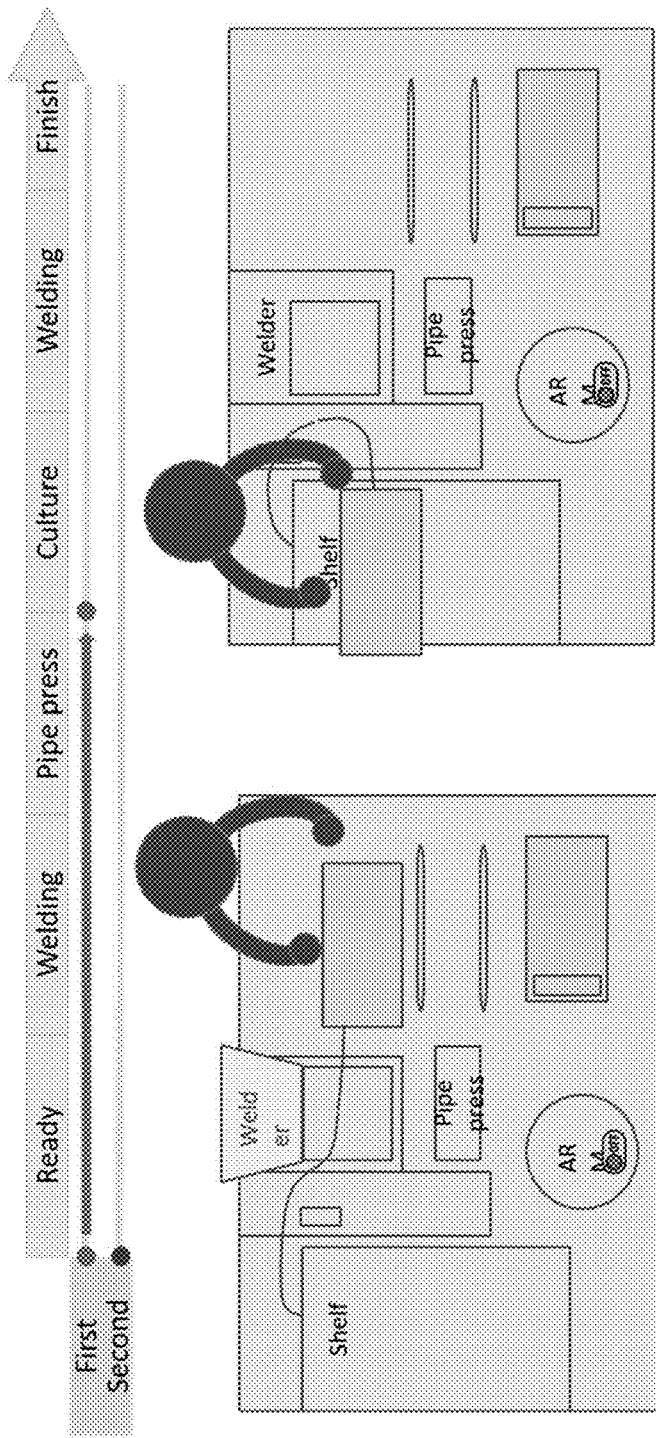
FIGS. 21-26 illustrate different stages of an operation process for a system having a moving device, cutting and/or welding device and a housing in some embodiments.
Figure 22:
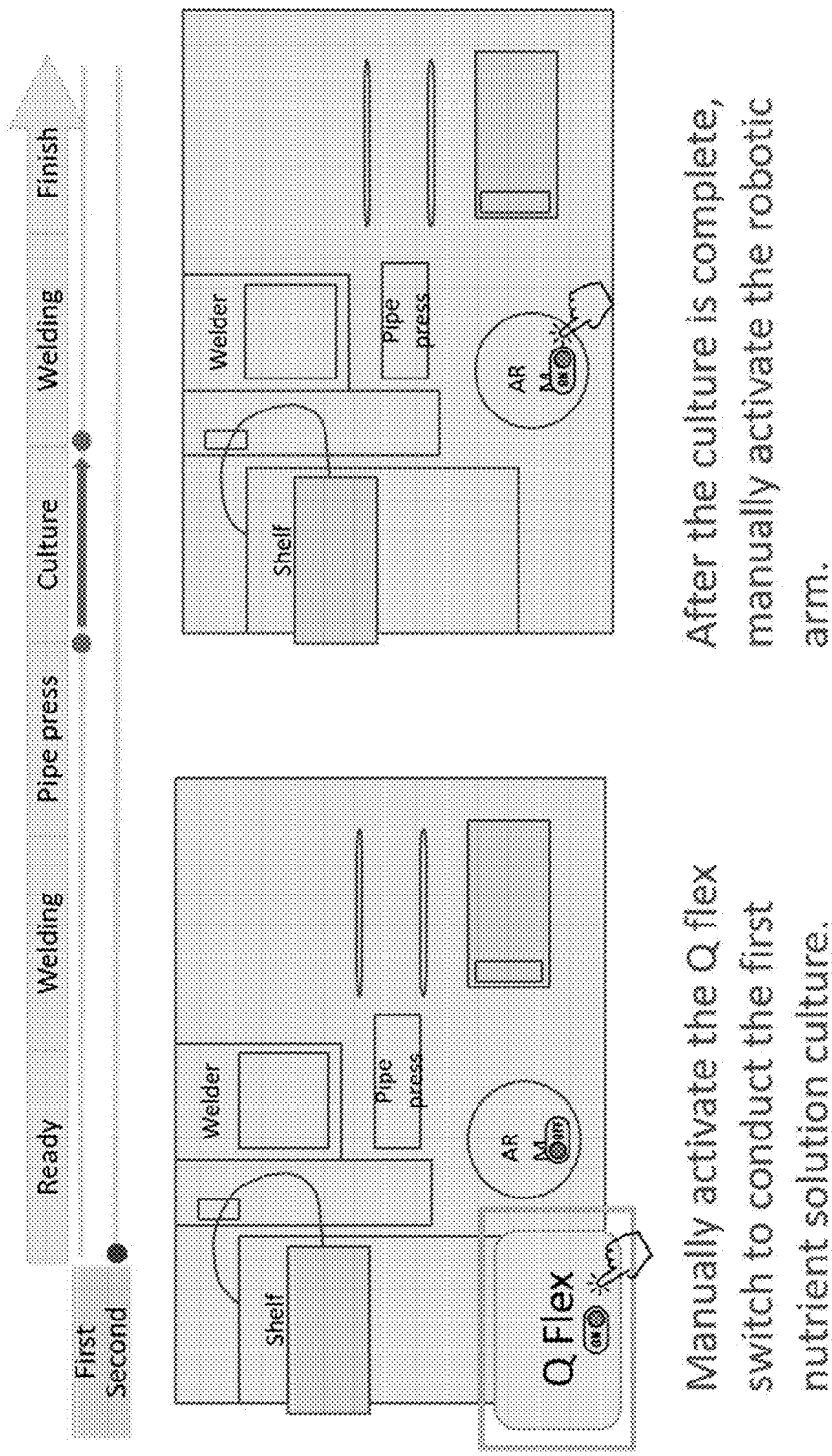
Figure 23:
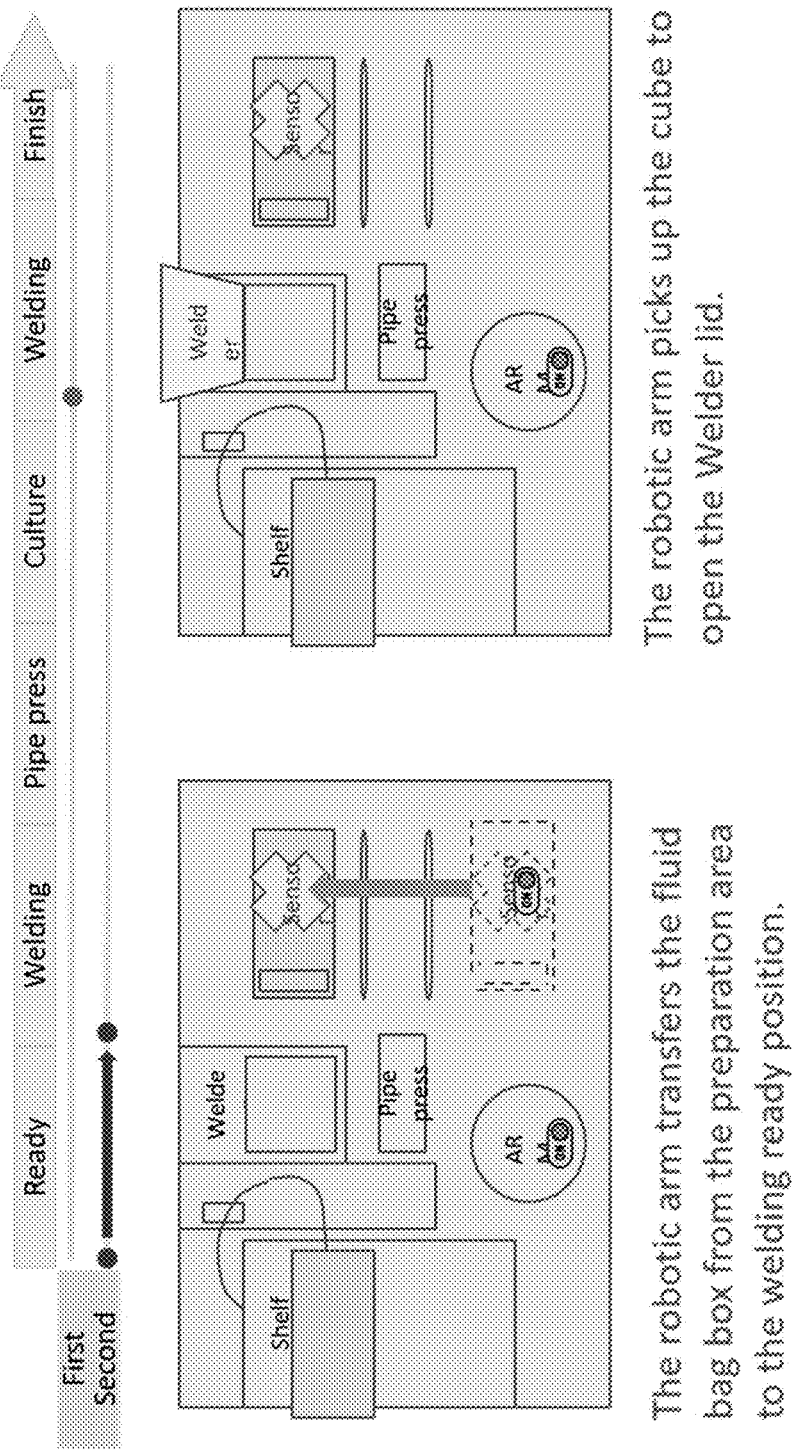
Figure 24:
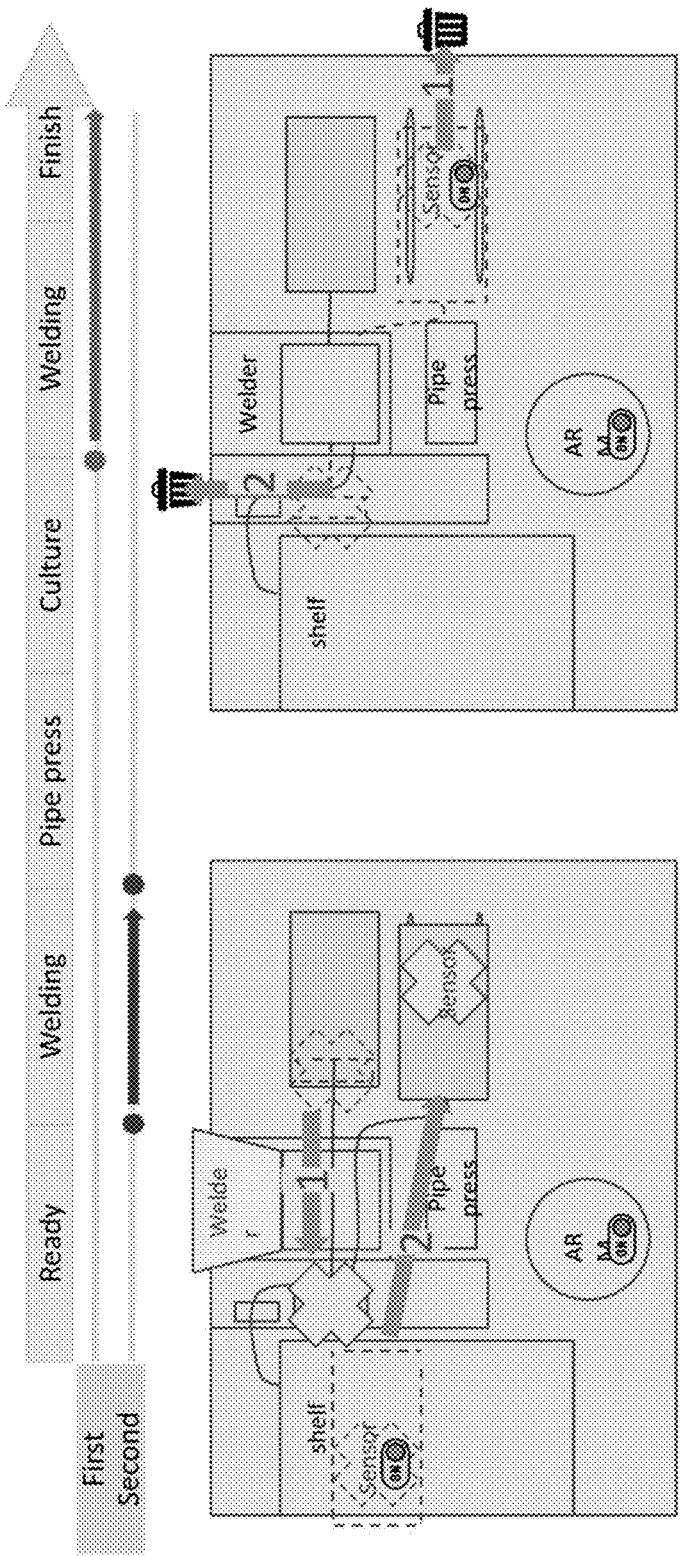
Figure 25:
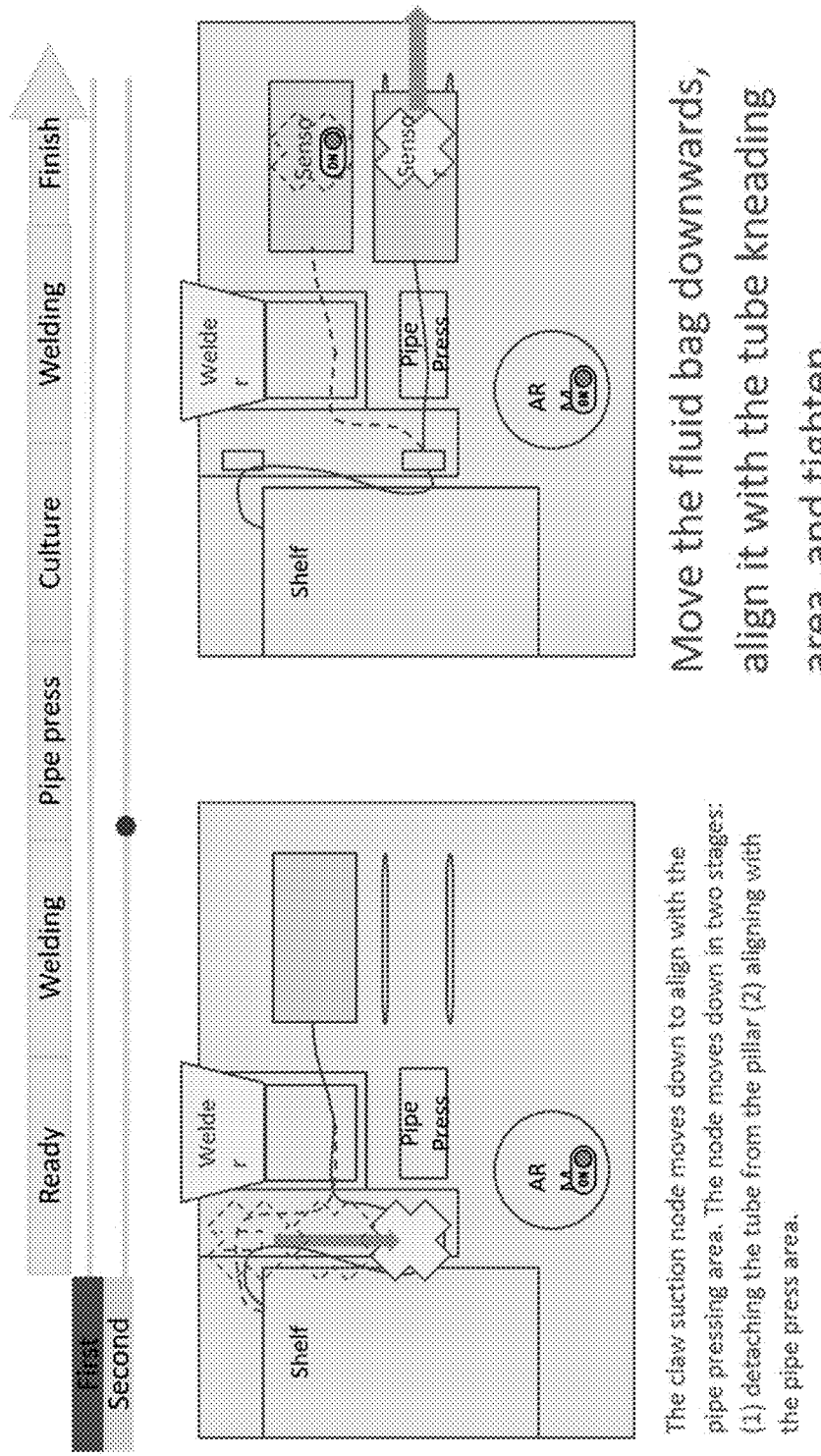
Figure 26:
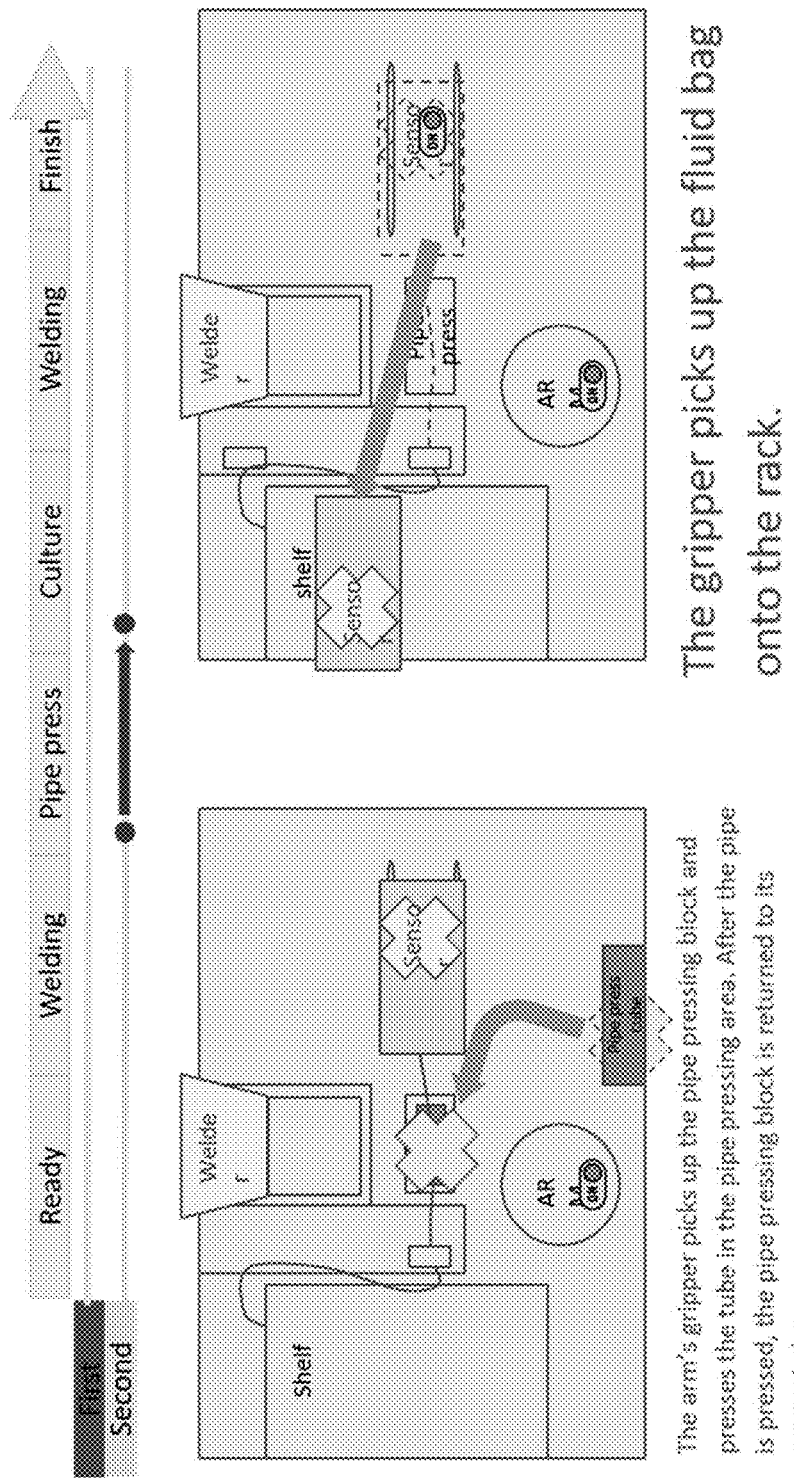
Figure 27:
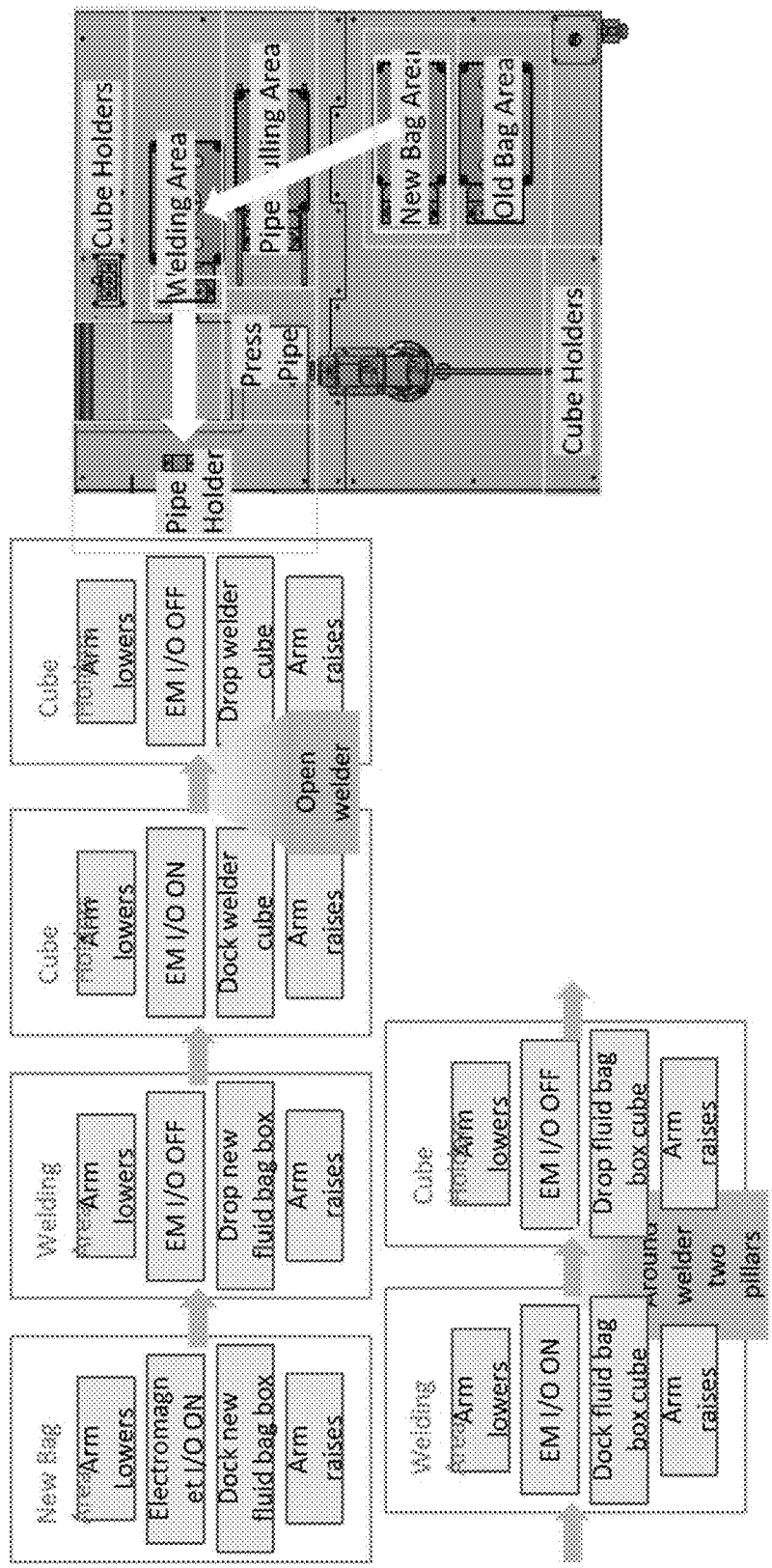
FIGS. 27-30 illustrate a process of replacing a flexible bag in a housing with another flexible in another housing based on the operation of a moving device and a cutting and/or welding device.
Figure 28:
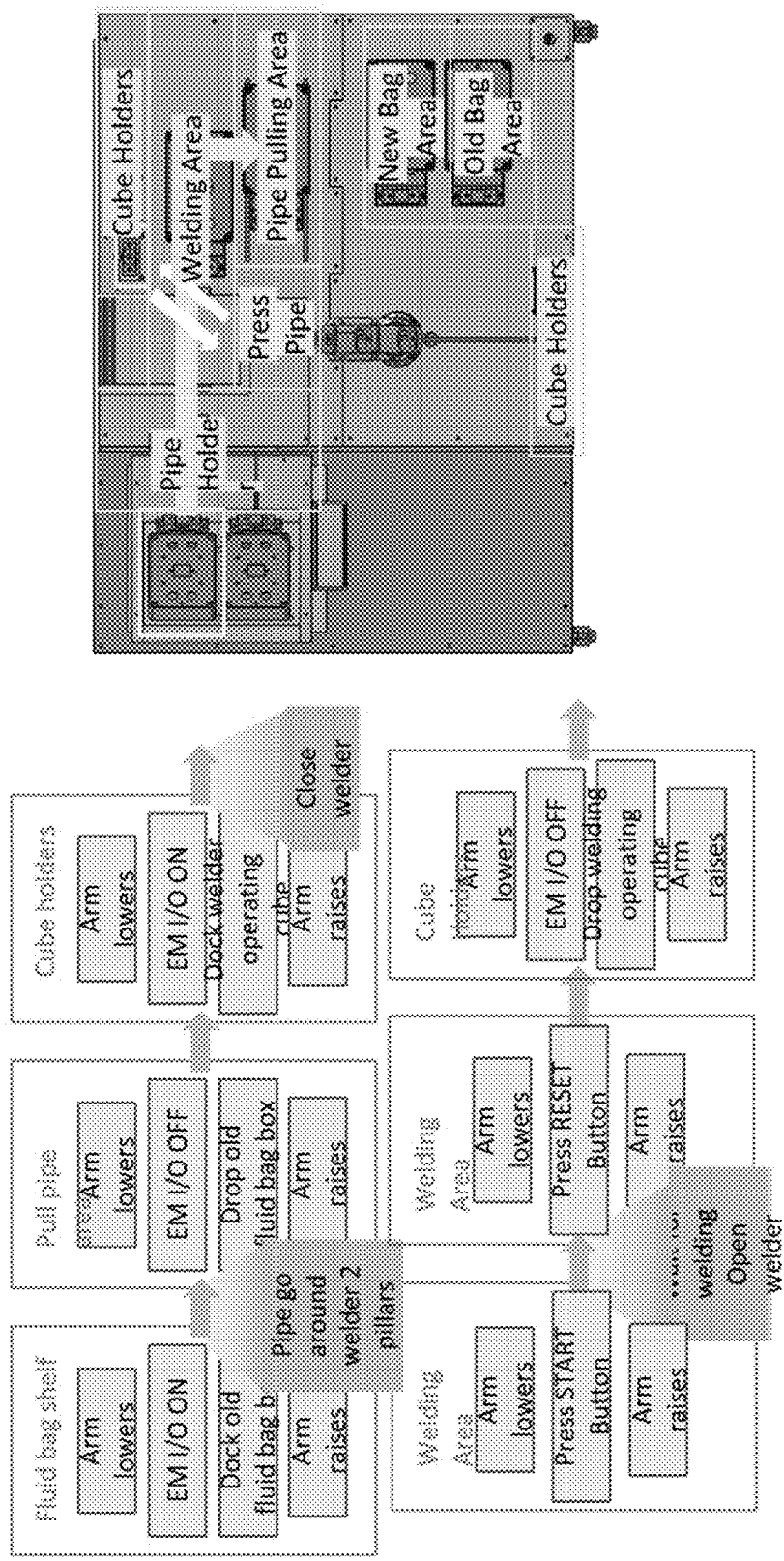
Figure 29:
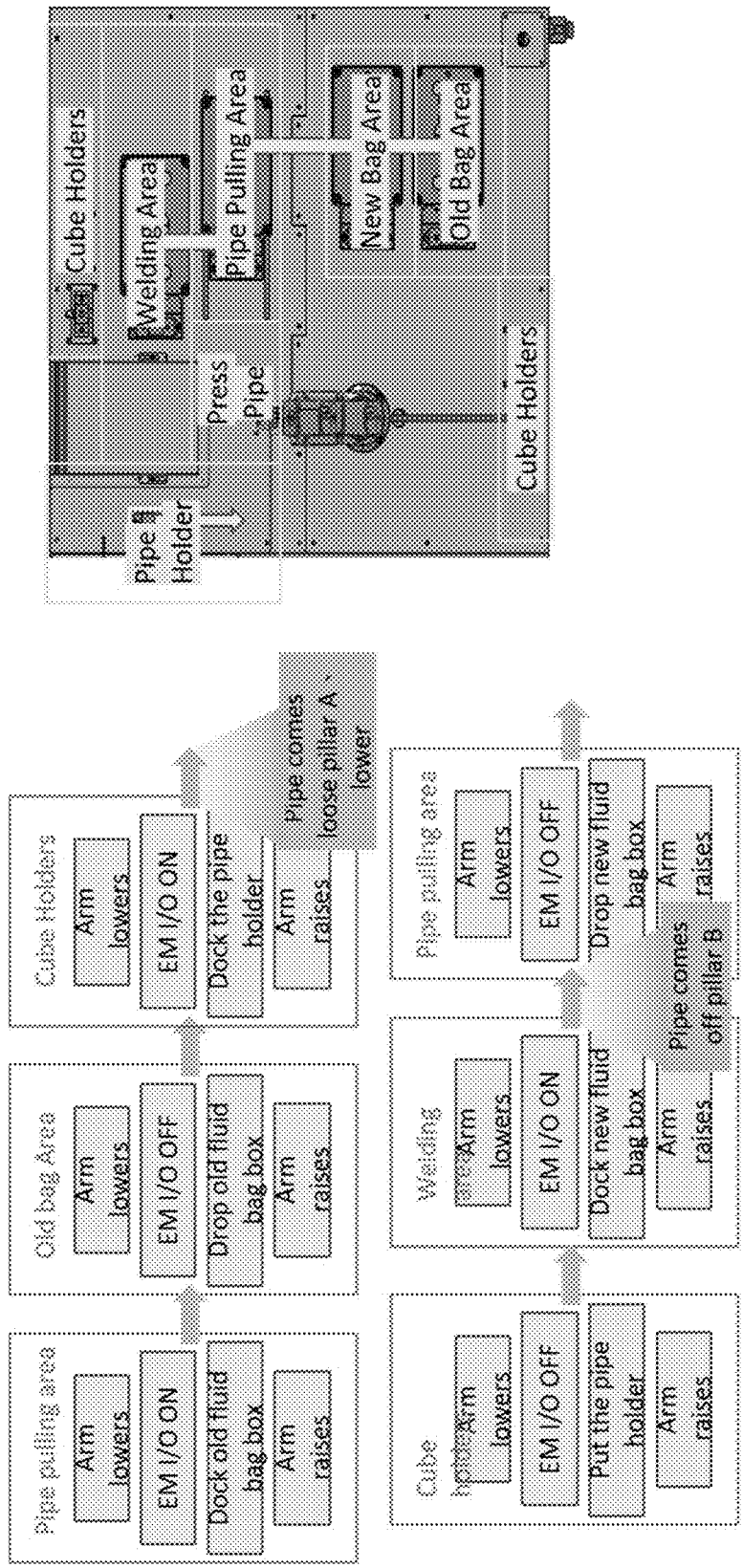
Figure 30:
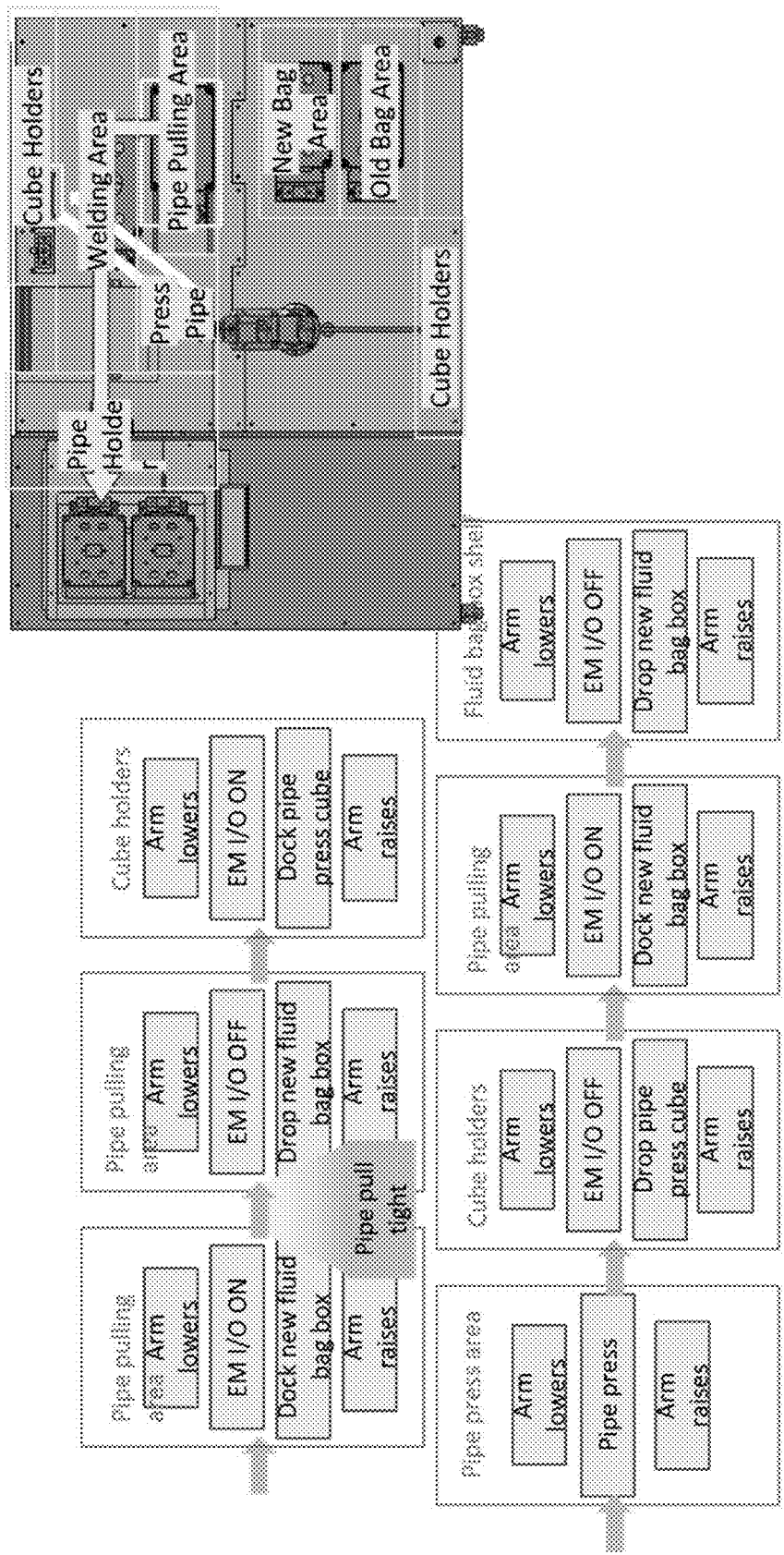
Figure 31:
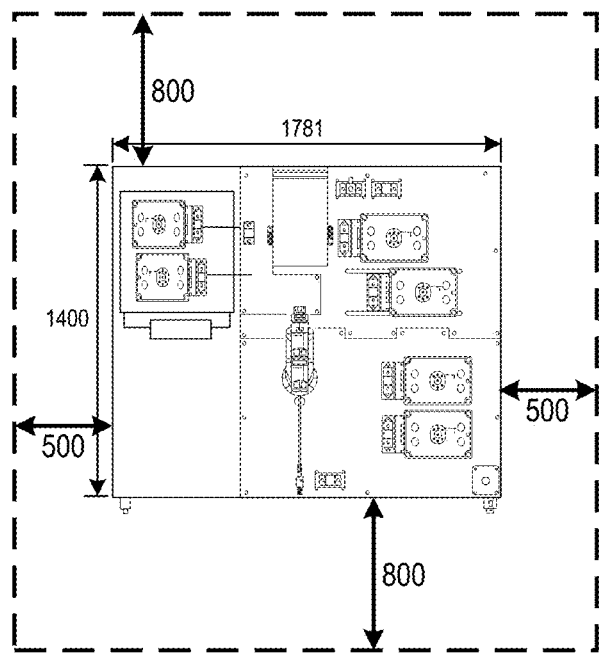
FIG. 31 illustrates an arrangement of a moving device and housing with respect to a platform in some embodiments.

FIGS. 21-26 illustrate different stages of an operation process for a system having a moving device, cutting and/or welding device and a housing in some embodiments. Referring to FIG. 21, a user of the system 100 can initially set up the tube connection between a machine such as a cell culture machine or a reactor machine and a flexible liquid bag housed within a housing 11. In some embodiments, a user can manually perform welding and pipe pressing actions, and place the fluid bag box on the rack 60 as a housing holder 60. Referring to FIG. 22, a user can manually set up or activate the operation of the machine in some embodiments. In some embodiments, a user can set up or initiate the operation of the moving device 30 such as a robotic arm 30. Referring to FIGS. 23-26, The robotic arm transfers the housing 11 from the preparation area to the welding ready position in some embodiments. For each operation, the robotic arm picks up a relevant type of an attaching structure module 35 to perform relevant operation, such as opening a lid of the cutting and/or welding device. FIGS. 27-30 illustrate a process of replacing a flexible bag in a housing with another flexible in anther housing based on an operation of a moving device and a cutting and/or welding device. FIG. 31 illustrates an arrangement of a moving device 30 and housing 11 with respect to a platform 40 in some embodiments.

Referring to FIGS. 23-31, in some embodiments, the tube cutting and welding device 50 may be adapted to cut and weld the fluid outlet tube of the flexible liquid bag 12 and the fluid inlet tube of the container in a cell culturing machine or a reactor machine. In some embodiments, a portion of the fluid outlet tube in between the proximal and distal portions of the fluid outlet tube, e.g., the tube connected to the flexible liquid bag 12 in a housing 11 is to be cut by the cutting and welding device 50 to expose of a cut portion of the fluid outlet tube connected to the distal portion and to the flexible liquid bag. In some embodiments, the cut portion of the fluid outlet tube is to be shifted by the cutting and welding device to be aligned with a tube end of the fluid inlet tube to be welded to the tube end. In some embodiments, the cut portion of the fluid outlet tube is to be welded by the cutting and welding device 50 to a tube end of the fluid inlet tube connected to the container to form a welded portion of the fluid outlet tube welded to the fluid inlet tube. In some embodiments, the moving portion, which can be an attaching member 33 or an attaching structure module 35 and included in the moving device 30 such as a robotic arm 30, is to contact the welded portion to increase fluid flow through the welded portion. In some embodiments, the welded portion is to be pushed by the moving portion such as an attaching member 33 or an attaching structure module 35 included in the moving device 30. In some embodiments, the welded portion is to be roll-milled by the moving portion such as an attaching member 33 or an attaching structure module 35. In some embodiments, the tube attachment member 35-1 coupled to the distal portion of the tube is to be moved to change tension of the tube in between the proximal and distal portions of the tube when the tube holding portion is coupled to the proximal portion of the tube. The tube attachment member 35-1 is to be moved by the moving device to change the tension between the first and distal portions of the tube.

Figure 32:
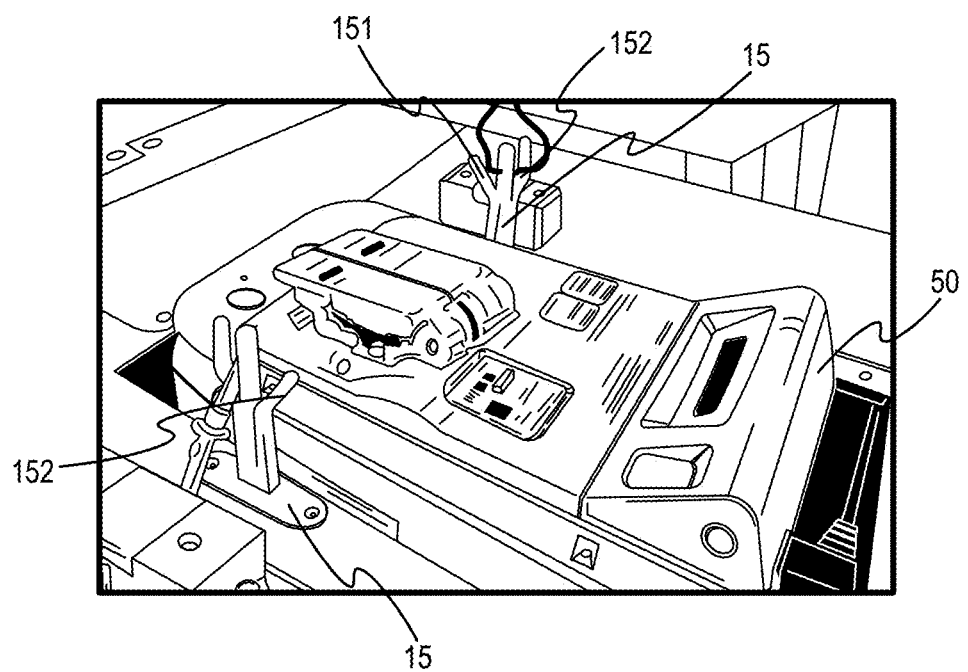
FIG. 32 illustrates a cutting and welding device arranged with a tube guiding member 15 in some embodiments.

FIG. 32 illustrates a cutting and welding device 50 arranged with a tube guiding member 15 in some embodiments. Referring to FIG. 32, the in some embodiments, the tube cutting and welding device 50 may be adapted to cut and weld the fluid outlet tube of the flexible liquid bag 12 and the fluid inlet tube of the container in a cell culturing machine or a reactor machine, for example, based on a sliding move to cut two tubes and weld two cut ends respectively from each cut tube. In some embodiments, a tube guiding member 15 can be provided to guide a tube with respect to the cutting and welding machine 50, e.g., to align the tube with respect to the cutting and welding machine 50, such as a tube insertion portion or lost provided by the cutting and welding machine 50. In some embodiments, the tube guiding member 15 can withstand the tension or force, to provide or maintain the tension of the tube. In some embodiments, the tube guiding member 15 can align the fluid inlet tube connected to the container of a cell culture machine or other types of machines and the fluid outlet tube connected to the flexible liquid bag 12 provided in the housing 11. In some embodiments, the tube guiding member 15 can be based on various structures to guide a tube. For example, in some embodiments, the tube guiding member 15 may have a tube guiding portion. For example, in some embodiments, the tube guiding member 15 may have a tube guiding portion. For example, in some embodiments, referring to FIG. 32, the tube guiding member 15 may have a first tube guiding portion 151 and a second guiding portion 152. In some embodiments, the first tube guiding portion 151 or the second guiding portion 152 may have a slot to guide or accommodate a tube. In some embodiments, referring to FIG. 32, the first tube guiding portion 151 or the second guiding portion 152 may have a wider opening to facilitate the insertion or sliding of the tube into the slot to guide or accommodate a tube.

FIGS. 33A-33G illustrates a process of replacing a flexible liquid bag with another flexible liquid bag by disconnecting a fluid inlet tube connecting a container and the flexible liquid bag and connecting a fluid outlet tube of the other flexible liquid bag to the disconnected tube for the container.

Figure 33A:
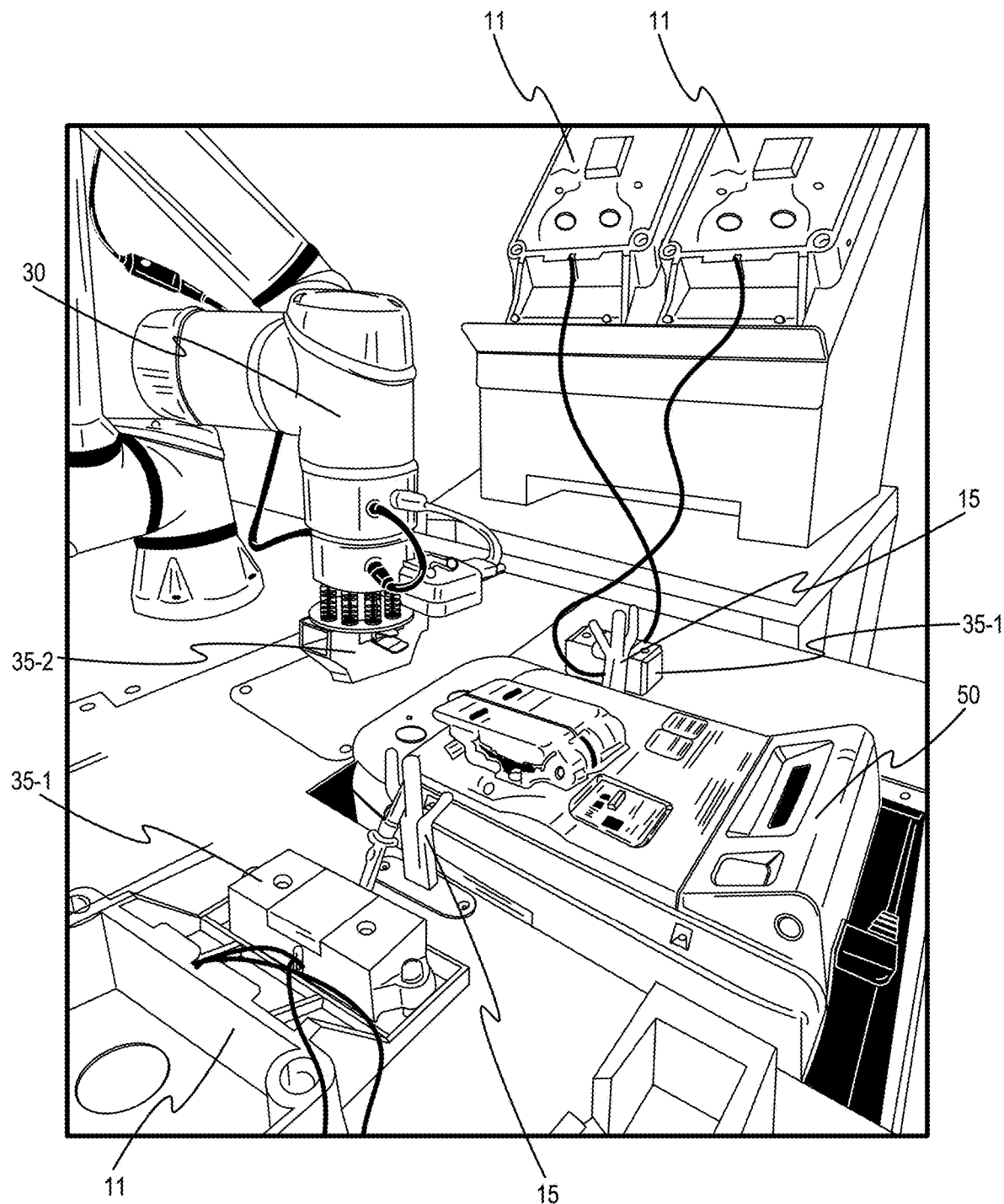
FIGS. 33A-33G illustrate a process of replacing a flexible liquid bag with another flexible liquid bag by disconnecting a fluid inlet tube connecting a container and the flexible liquid bag and connecting a fluid outlet tube of the other flexible liquid bag to the disconnected tube for the container.
Figure 33B:
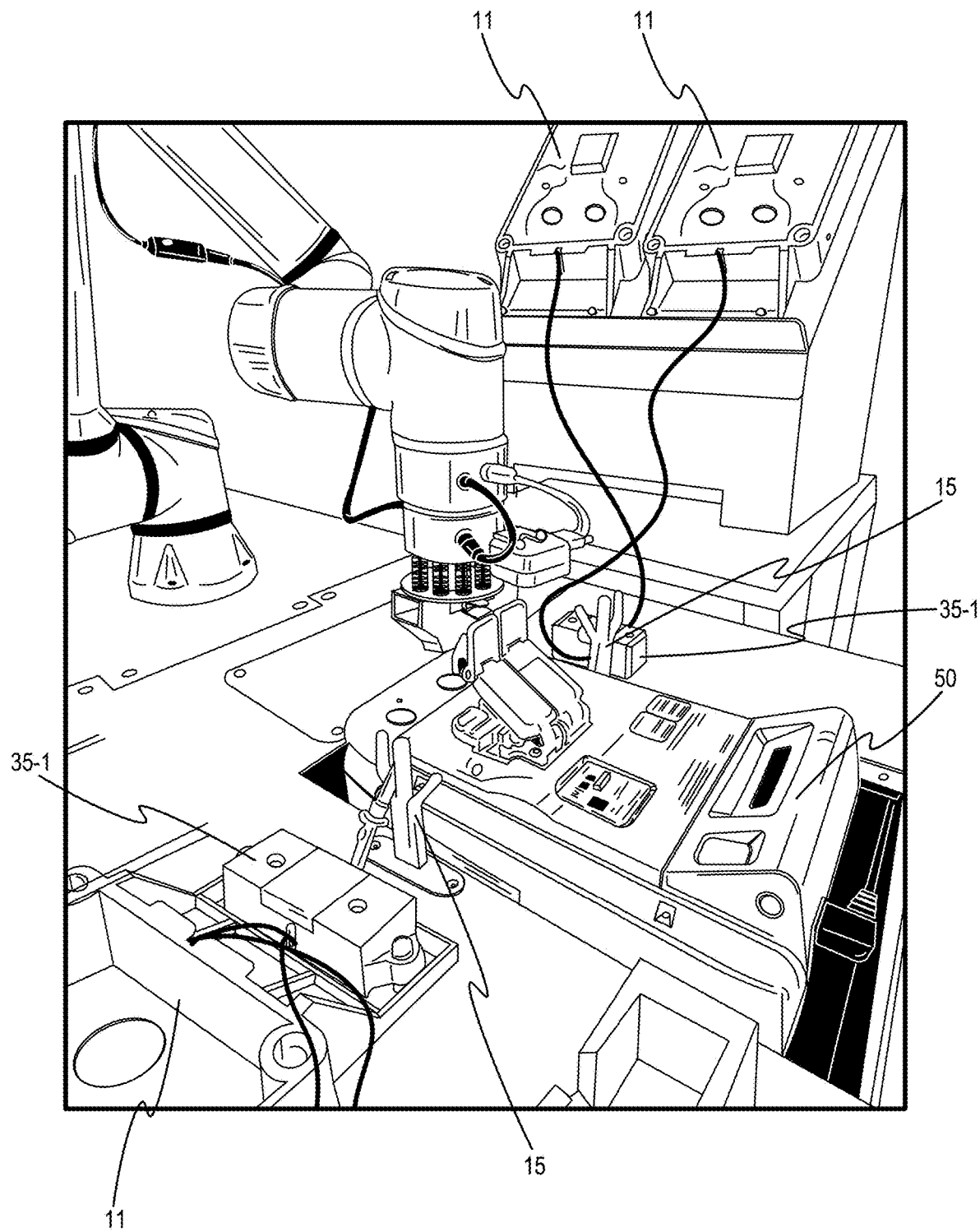

Referring to FIG. 33A, when a first housing 11, which includes a flexible bag 12 connected to a container via an inlet tube, and which is placed on the housing holder 60, is to be replaced, the robotic arm 30 can be coupled to an operation structure module 35-2. A new, fresh second housing including a flexible bag 12 and a second tube attachment member 35-1 can be provided with respect to the robotic arm 30 or with respect to the cutting and welding device 50 or tube guiding members 15.

Referring to FIG. 33 B, in some embodiments, the robotic arm 30 using the attached operation structure module 35-2 opens a cover of the tube sliding slots of the cutting and welding device 50.

Figure 33C:
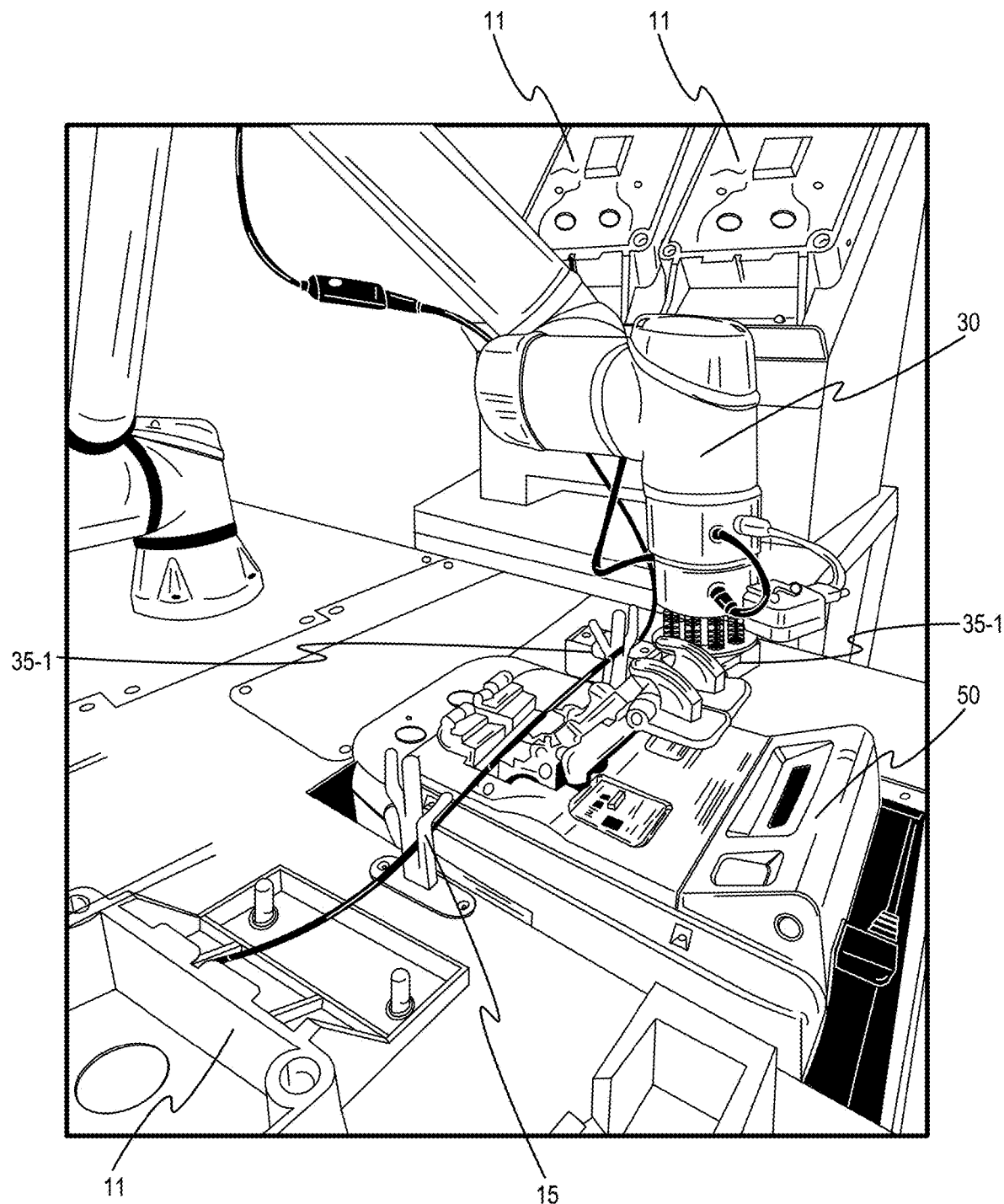

Referring to FIG. 33C, in some embodiments, the robotic arm 30 detaches the operation structure module 35-2, possibly to the operation structure module holder 36-2 and attaches to the second tube attachment member 35-1 holding the fluid outlet tube. The robotic arm 30 then attaches and moves the second housing 11 and/or the second tube attachment member 35-1 to insert the fluid outlet tube held by the second tube attachment member 35-1 into the second guiding portions 152 of the respective tube guiding members 15. In some embodiments, the robotic arm 30 can move the second tube attachment member 35-1 to pull the fluid outlet tube against one of the tube guiding members 15 to create a tension.

Figure 33D:
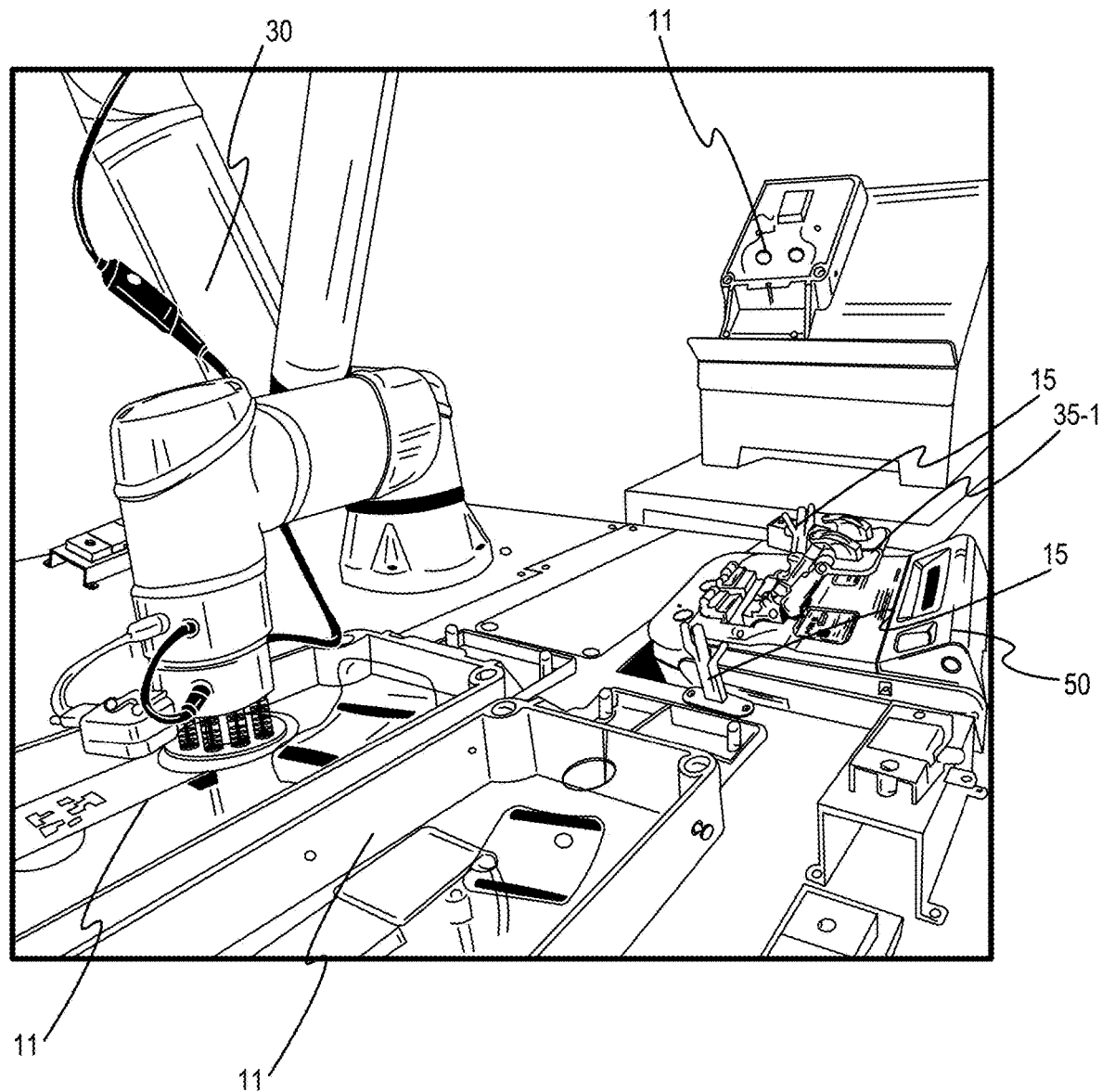

Referring to FIG. 33D, in some embodiments, the robotic arm 30 detaches the second tube attachment member 35-1 and attaches to the first housing can move the first housing 11 to decouple the first housing 11 from the housing holder 60 and place the first housing on the platform 40 coupling the docking portion of the first housing 11 to the receiving portion on the platform 40. The robotic arm 30 then attaches and moves the first housing 11 and/or the first tube attachment member 35-1 holding the fluid inlet tube to insert the fluid inlet tube held by the first tube attachment member 35-1 into the first guiding portions 152 of the respective tube guiding members 15. In some embodiments, the robotic arm 30 can move the first tube attachment member 35-1 to pull the fluid outlet tube against one of the tube guiding members 15 to create a tension.

Figure 33E:
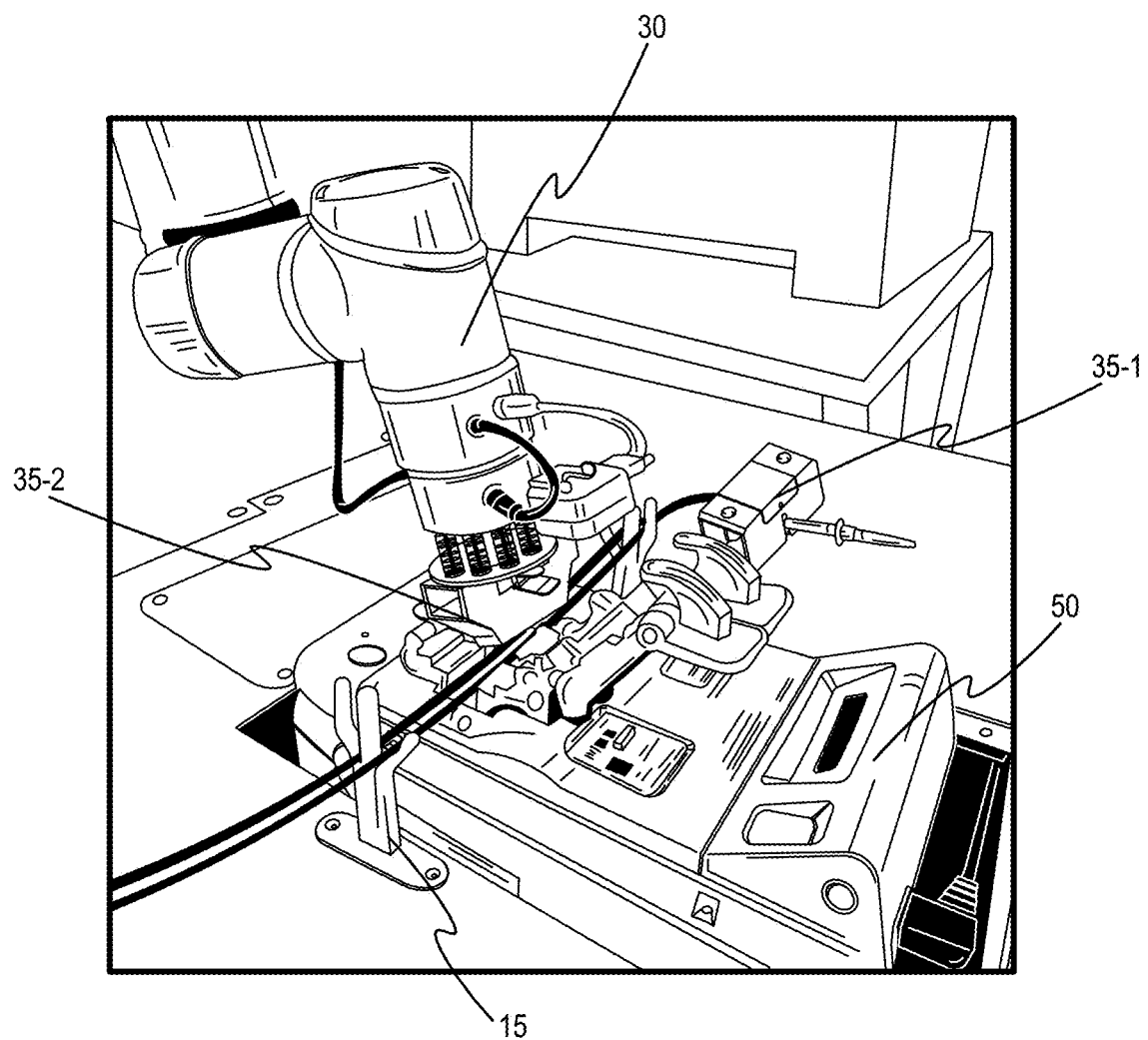
Figure 33F:
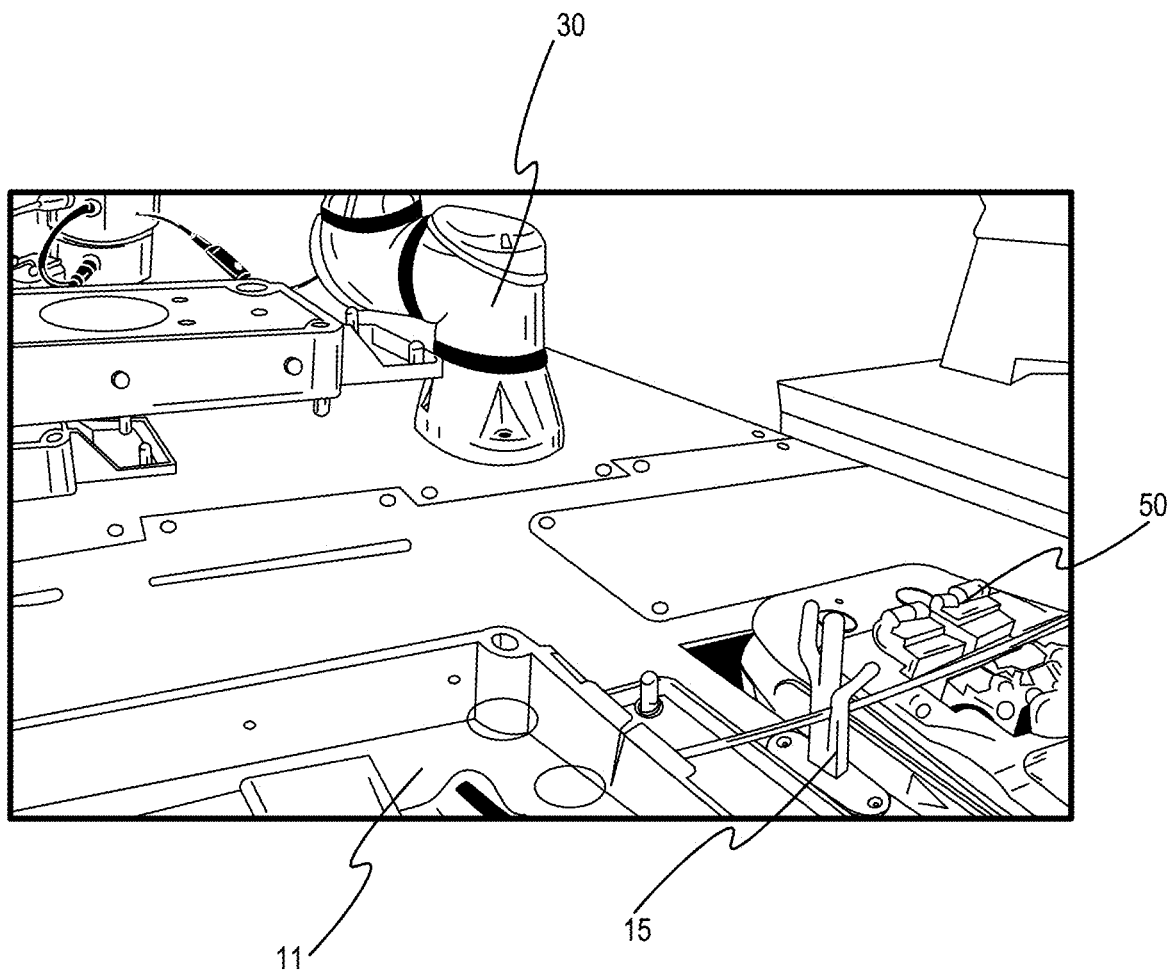

Referring to FIG. 33E, the robotic arm 30 attaches to the operation structure module 35-2 and insert the fluid inlet and fluid outlet tubes into the tube slots of the cutting and welding device 50 using the operation structure module based on various motions. After both tubes are inserted, the robotic arm 30 closes the slot for the process of the cutting and welding process by the cutting and welding device 50 using the operation structure module 35-2. Referring to FIG. 33F, the robotic arm 30 using the operation structure module 35-2 opens up the slot. The robotic arm 30 then detaches from the operation structure module 35-2 and attaches to the first housing 11 to move the first housing to a location to remove the first housing from the process.

Figure 33G:
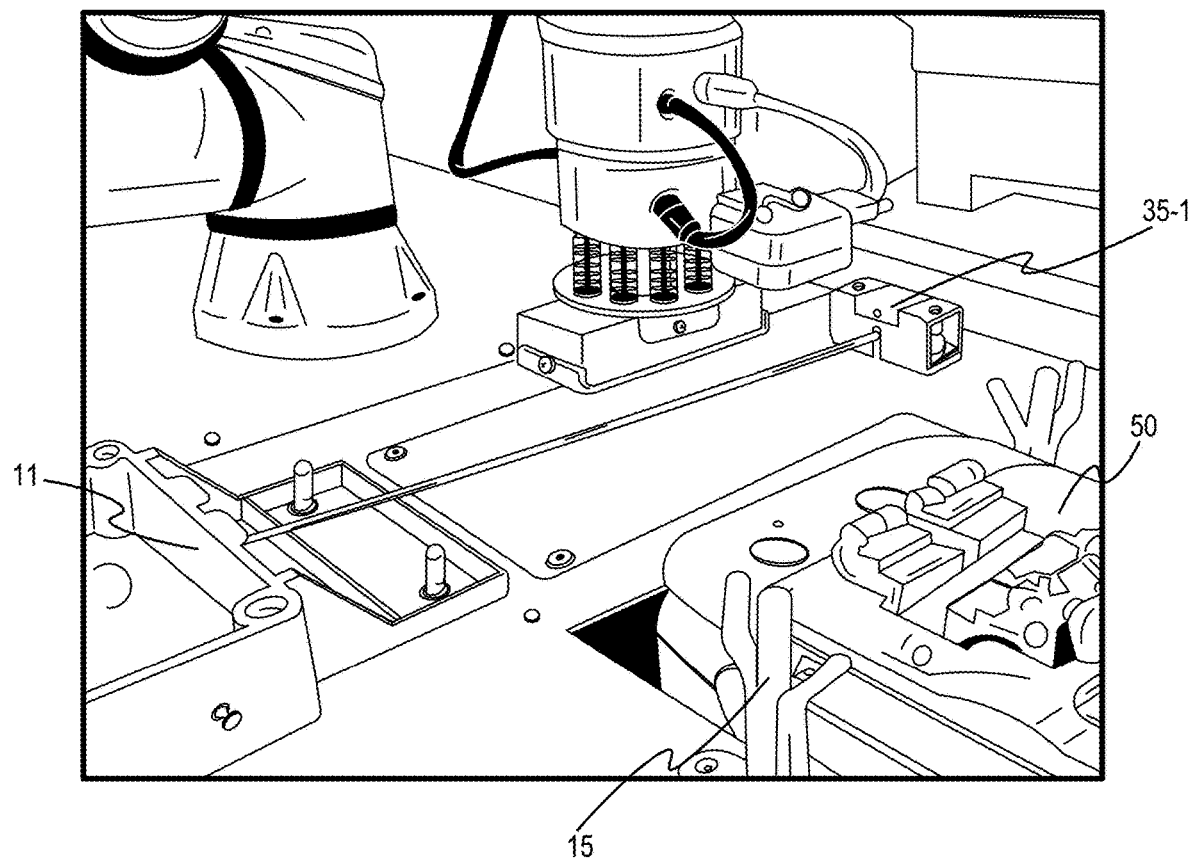

Referring to FIG. 33G, the robotic arm 30 attaches to the first tube attachment member 35-1 and/or the second housing 11 now connected to the inlet fluid tube and the first tube attachment member 35-1 holding the fluid inlet tube, to move the welded portion of the inlet tube out of the cutting and welding device 50 and out of the tube guiding members 15. The robotic arm 30 then attaches to the pipe pressing structure module and press, roll, or make one of other various motions to facilitate the opening of or fluid flow through the weld portion of the fluid inlet tube. The robotic arm 30 may attach to the second housing 11 to place the second housing 11 to the housing holder to continue to supply the liquid from the second housing 11 to the container. The robotic arm 30 may also move the first tube attachment member 35-1 holding the fluid inlet tube to relocate the fluid inlet tube, for example, to ensure the flow through the fluid inlet tube.

The present disclosure relates to robotics data and machine learning that can be used to train a machine learning algorithm, and any type of patient data and surgical robotics data known in the relevant art, such as described herein, can be used. In some embodiments, additional parameters can include profiles, such as the radius, angle and longitudinal position of the housing. This can be combined with real time imaging from a sensor for a moving device. In some embodiments, images can be processed with image segmentation, for example, to determine a location of an object such as a housing or its structure. In some embodiments, artificial intelligence software instructions can be configured to automatically identify the structures and different devices and components and determine the relative locations of each. The data can be vectorized and input into the machine learning classifier, for example.

In some embodiments, automatic liquid preparation devices often necessitate the coordination of multiple mechanical arms during the liquid preparation process. However, the intricate movement trajectories of these arms frequently lead to collisions and other complications, resulting in a cumbersome experimental process, elevated costs, and a low level of automation.

The present disclosure is related to robotics data and machine learning that can be used to train a machine learning algorithm, and any type of data and robotics data as described herein can be used. In some embodiments, this can be combined with sensor data such as imaging including real time imaging from the imaging devices. In some embodiments, the images may comprise a portion of the laboratory platform described herein. In some embodiments, the images can be processed with image segmentation, for example, to determine the location of the housing or a flexible bag. The artificial intelligence software instructions can be configured to automatically identify structure or arrangements of different equipment or objects. The data can be vectorized and input into the machine learning classifier, for example.

In some embodiments, devices, kits, systems and methods disclosed herein may comprise a sensor or detector such as a plurality of sensors, each of which is capable of measuring and recording states of various systems and objects such as the robotic system components, which can be used for analysis to improve the automated procedures and outcomes. For example, the robotics system may comprise a plurality of parameters related to the state of the system and associated components, such as an angle of a shaft, a longitudinal position of a shaft, data related to energy used to an object such as a liquid bag or a housing containing a liquid bag (e.g. pressure or irradiance), real time imaging for example. In some embodiments, data during a process can be recorded in real time and used to generate a plurality of data frames corresponding to the state of the robotics system throughout the process. The data frames may correspond to fixed time intervals between frames, e.g. one second, in order to provide input data suitable for processing with machine learning or artificial intelligence as described herein.

In some embodiments, input data can be generated and recorded from or for many types of systems. The presently disclosed methods and apparatus are well suited for combination with many applications related to robotics, and can incorporate the hardware, processors and software of many prior systems.

In some embodiments, the processor, controller and control electronics and circuitry can include one or more of many suitable components, such as one or more processor, one or more field-programmable gate array (FPGA), and one or more memory storage devices. In many embodiments, the control electronics controls the control panel of the graphic user interface (hereinafter "GUI") to provide for, for example, a process planning.

In some embodiments, the sensor data, position data, and recorded treatment positions may comprise any of the sensor data, position data, and recorded treatment positions as described herein. The recorded data may comprise data of locations, status, and various properties, the light source, the arm lock, the arm controller, the linkage, each of the angle sensors, the patient support, or the base, for example.

In some embodiments, The data may comprise priming data, docking data, angle data, scale data, calibration data, cut profile data, corresponding times of one or more of these, and planned treatment time, for example.

In some embodiments, the data can be modified with the artificial intelligence or machine learning as described herein.

A method of locating and moving a housing containing a flexible liquid bag can be provided in some embodiments, such as those involving artificial intelligence, machine training or deep learning. While the method can be performed in many ways, in some embodiments, the robotics data comprises a plurality of parameters recorded during the process, a process time, a set up time, an imaging time, a time a sensor moves and reads, a plurality of locations and orientations of the housing and robotic arm, a plurality of images For example, FIG. 32 illustrates an example method of locating and moving a housing containing a flexible liquid bag in some embodiments.

Figure 34:
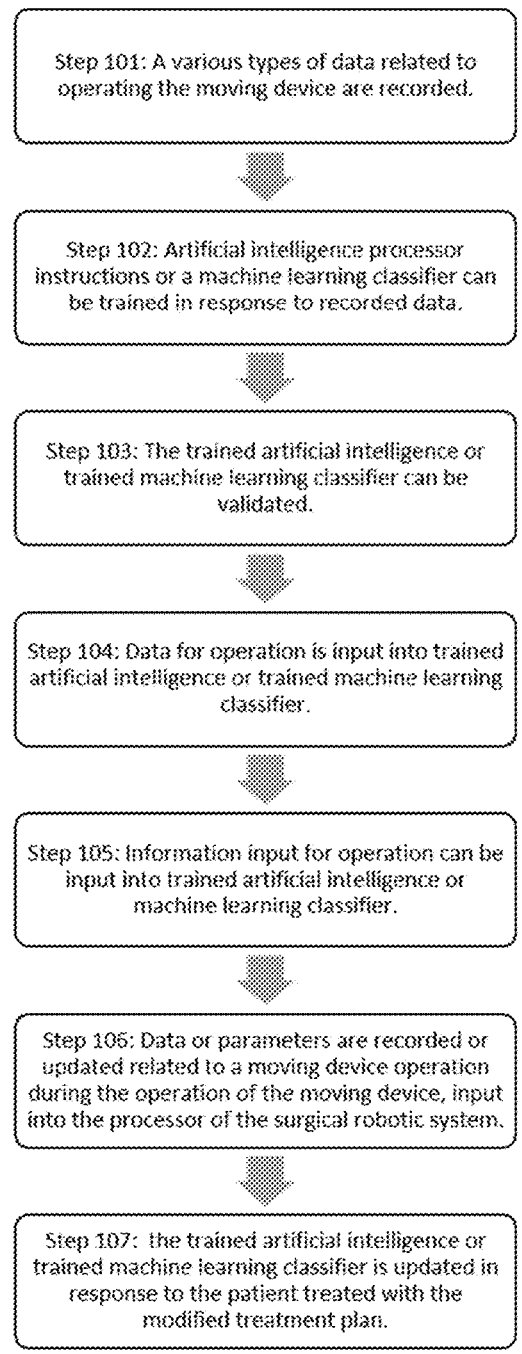
FIG. 34 illustrates an example method of locating and moving a housing containing a flexible liquid bag in some embodiments.

Referring to FIG. 34, At a step 101 a various types of data related to operating the moving device such as location coordinates and different parameters such as temperature are recorded. For example, in some movements, set up data related to the process or operation of robotic arm can be recorded. In some embodiments, different statuses, conditions, or parameters of the process such as a cell culture can be recorded. In some embodiments, sensor data and data related to one or more robotic components can be recorded. In some embodiments, the data corresponding to each of the plurality of images can be recorded. In some embodiments, data frames can be generated from various types of data, such as the plurality of images and sensor data and other operating data. In some embodiments, the data frames may comprise image frames corresponding to fixed intervals, such as one second between frames. In some embodiments, Alternatively or in combination vectorized data can be generated from the image frames.

At a step 102, artificial intelligence processor instructions or a machine learning classifier can be trained in response to recorded data such as data in step 101. In some embodiments, artificial intelligence processor instructions may comprise one or more of machine learning, search and mathematical optimization, artificial neural networks, statistics, probability, support vector machine learning, clustering of data groups, image classification, image segmentation. In some embodiments, the machine learning processor instructions may comprise one or more of decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule based machine learning or a learning classifier system.

At a step 103 the trained artificial intelligence or trained machine learning classifier can be validated.

At a step 104 data for operation is input into trained artificial intelligence or trained machine learning classifier.

At a step 105 information input for operation can be input into trained artificial intelligence or machine learning classifier.

At a step 106 data or parameters are recorded or updated related to a moving device operation during the operation of the moving device, input into the processor of the surgical robotic system.

At a step 107 the trained artificial intelligence or trained machine learning classifier is updated in response to data or parameters that are recorded or updated.

One or more steps of the artificial intelligence-based method may be performed with circuitry or processor instructions as described herein, for example, one or more of a processor or a logic circuitry of the systems described herein. The circuitry may be programmed to provide one or more steps 101 through 107, and the program may comprise program instructions stored on a computer readable memory or programmed steps of the logic circuitry such as with programmable array logic or a field programmable gate array, for example.

In some embodiments, the platforms, systems, media, and methods described herein may include a digital processing device, or use of the same. In some embodiments, the digital processing device includes one or more hardware central processing units (CPUs) or general purpose graphics processing units (GPGPUs) that carry out the device's functions. In some embodiments, the digital processing device may further comprise an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tape drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 35:
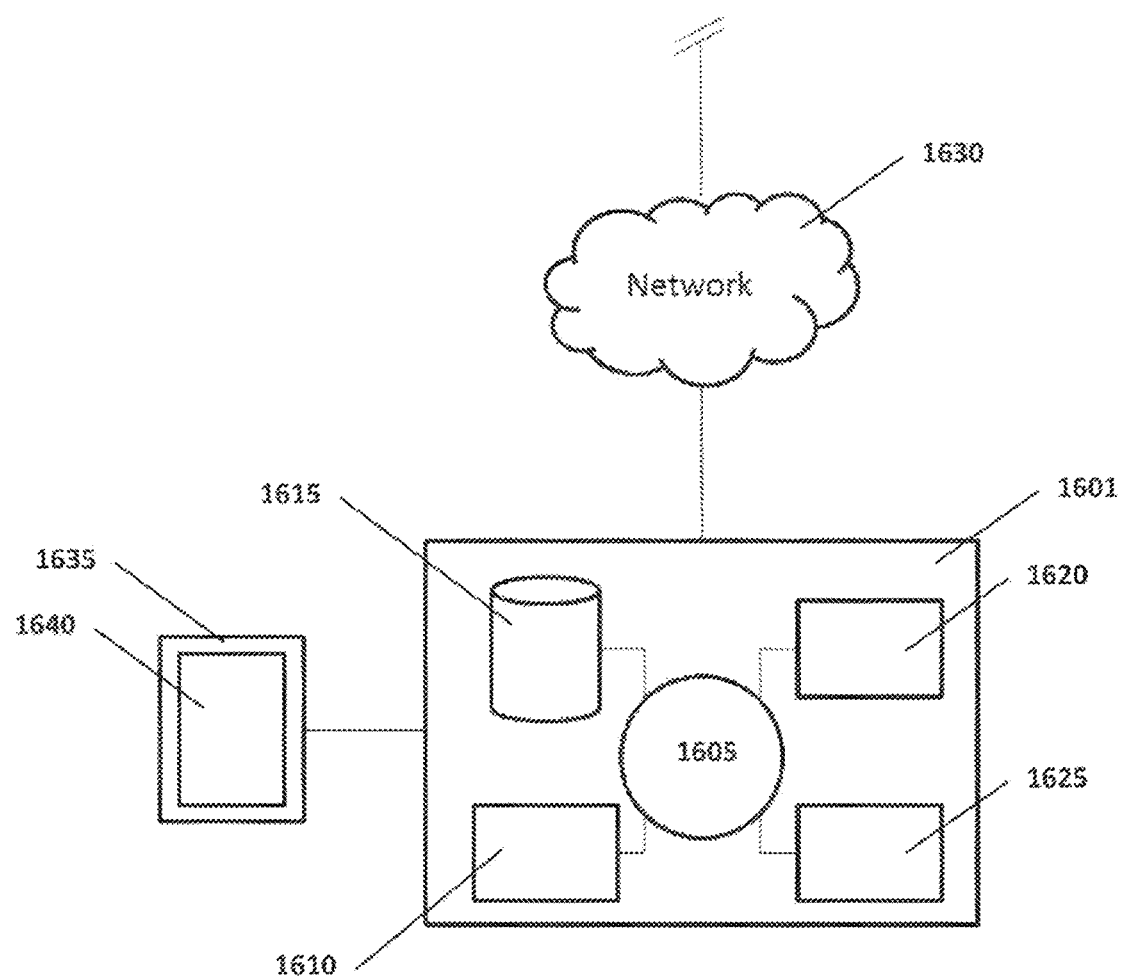
FIG. 35. illustrates a processor system, in accordance with some embodiments.

For example, FIG. 35. illustrates a processor system, in accordance with some embodiments.

Referring to FIG. 35, in a particular embodiment, an exemplary digital processing device 1601 is programmed or otherwise configured to use artificial intelligence or machine learning to set up, plan or perform a surgical robotics procedure. The device 1601 can regulate various aspects of the machine learning and artificial intelligence of the present disclosure, such as, for example, determination of a cut profile in response to data of a patient to be treated and data from previously treated patients and previous surgical procedures as described herein. In this embodiment, the digital processing device 1601 includes a central processing unit (CPU, also "processor" and "computer processor" herein) 1605, which can be a single core or multi core processor, or a plurality of processors for parallel processing. The digital processing device 1601 also includes memory or memory location 1610 (e.g., random-access memory, read-only memory, flash memory), electronic storage unit 1615 (e.g., hard disk), communication interface 1620 (e.g., network adapter) for communicating with one or more other systems, and peripheral devices 1625, such as cache, other memory, data storage and/or electronic display adapters. The memory 1610, storage unit 1615, interface 1620 and peripheral devices 1625 are in communication with the CPU 1605 through a communication bus (solid lines), such as a motherboard. The storage unit 1615 can be a data storage unit (or data repository) for storing data. The digital processing device 1601 can be operatively coupled to a computer network ("network") 1630 with the aid of the communication interface 1620. The network 1630 can be the Internet, an internet and/or extranet, or an intranet and/or extranet that is in communication with the Internet. The network 1630 in some cases is a telecommunication and/or data network. The network 1630 can include one or more computer servers, which can enable distributed computing, such as cloud computing. The network 1630, in some cases with the aid of the device 1601, can implement a peer-to-peer network, which may enable devices coupled to the device 1601 to behave as a client or a server.

Continuing to refer to FIG. 35, the CPU 1605 can execute a sequence of machine-readable instructions, which can be embodied in a program or software. The instructions may be stored in a memory location, such as the memory 1610. The instructions can be directed to the CPU 1605, which can subsequently program or otherwise configure the CPU 1605 to implement methods of the present disclosure. Examples of operations performed by the CPU 1605 can include fetch, decode, execute, and write back. The CPU 1605 can be part of a circuit, such as an integrated circuit. One or more other components of the device 1601 can be included in the circuit. In some cases, the circuit is an application specific integrated circuit (ASIC) or a field programmable gate array (FPGA).

Continuing to refer to FIG. 35, the storage unit 1615 can store files, such as drivers, libraries and saved programs. The storage unit 1615 can store user data, e.g., user preferences and user programs. The digital processing device 1601 in some cases can include one or more additional data storage units that are external, such as located on a remote server that is in communication through an intranet or the Internet.

Continuing to refer to FIG. 35, the digital processing device 1601 can communicate with one or more remote computer systems through the network 1630. For instance, the device 1601 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processing device 1601, such as, for example, on the memory 1610 or electronic storage unit 1615. The machine executable or machine readable code can be provided in the form of software. During use, the code can be executed by the processor 1605. In some cases, the code can be retrieved from the storage unit 1615 and stored on the memory 1610 for ready access by the processor 1605. In some situations, the electronic storage unit 1615 can be precluded, and machine-executable instructions are stored on memory 1610.

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™ JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™ PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the platforms, systems, media, and methods disclosed herein include one or more databases, or use of the same. In view of the disclosure provided herein, those of skill in the art will recognize that many databases are suitable for storage and retrieval of patient information and surgical information as described herein. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based.

In some embodiments, the user select data to use with a selected algorithm, for example. This can allow the user to consider outcome likelihood odds and risks for differing scenarios and with a desired outcome versus risk, for example.

The user interface 1700 may comprise a user input 1760 for the user to select parameters of the model used to determine the values of the one or more of the safety and efficacy parameters as disclosed herein. This selection of the parameters can allow the user to pick parameters that may be more helpful than others, and to remove parameters that may be less helpful than others for a particular patient. For example, if a user believes that a parameter such as age is less helpful for predicting outcomes, the user can deselect that parameter as input to the classifier model used to predict the outcome. Alternatively, if the user believes that age is a helpful parameter, the user can select age as a parameter to be used as input to the classifier model.

The user interface 1700 may comprise a user input 1770 for the user to select data to be shown on the display. The data shown on the display may comprise visualization data for example. In some embodiments, the user can select whether to show a suggested treatment profile on the display overlaid with the planned treatment profile the patient after user adjustment. This can be helpful to the user to determine how far the planned treatment profile for the patient deviates from the profile suggested by the algorithm. The user can select additional types of visualization data to be shown on the display. For example, the user can select a planned trajectory of the energy source for the treatment.

NON-LIMITING EMBODIMENTS

The following Examples are detailed by way of illustration only and are not to be construed as limiting in spirit or in scope, many modifications both in materials and in methods will be apparent to those skilled in the art.

1. A handling kit for a flexible liquid bag having a fluid outlet tube to be moved by a moving device and to be cut and welded to a fluid inlet tube of a container by a tube cutting and welding device, the handling kit comprising:
   a housing sized to accept the flexible liquid bag in the housing, wherein the housing limits pressure change within the flexible liquid bag in the housing and further comprises
      an attachment portion to attach the housing to the moving device,
      a docking portion to dock the housing to a platform supporting the tube cutting and welding device, and
      a tube holding member to hold a proximal portion of the fluid outlet tube to restrict moving of the proximal portion of the fluid outlet tube with respect to the housing; and
   a tube attachment member to attach to a distal portion of the fluid outlet tube outside the housing, to restrict moving of the distal portion of the fluid outlet tube with respect to the tube attachment member.
2. The handling kit of embodiment 1, wherein the container contains a live cultured cell.
3. The handling kit of embodiment 1-2, wherein the tube cutting and welding device is adapted to cut and weld the fluid outlet tube of the flexible liquid bag and the fluid inlet tube of the container.
4. The handling kit of embodiment 3, wherein the fluid outlet tube or the fluid inlet tube are guided by a tube guiding member to guide the fluid outlet tube or the fluid inlet tube to be placed with respect to the cutting and welding device.
5. The handling kit of embodiment 4, wherein the tube guiding member includes a wider opening and a narrower tube accommodating portion.
6. The handling kit of embodiment 1-5, wherein a portion of the fluid outlet tube in between the proximal and distal portions of the fluid outlet tube is to be cut by the cutting and welding device to expose of a cut portion of the fluid outlet tube connected to the distal portion and to the flexible liquid bag.
7. The handling kit of embodiment 6, wherein the cut portion of the fluid outlet tube is to be shifted by the cutting and welding device to be aligned with a tube end of the fluid inlet tube to be welded to the tube end.
8. The handling kit of embodiment 6, wherein the cut portion of the fluid outlet tube is to be welded by the cutting and welding device to a tube end of the fluid inlet tube connected to the container to form a welded portion of the fluid outlet tube welded to the fluid inlet tube.
9. The handling kit of embodiment 8, wherein the moving portion included in the moving device is to contact the welded portion to increase fluid flow through the welded portion.

10. The handling kit of embodiment 8-9, wherein the welded portion is to be pushed by the moving portion included in the moving device.
11. The handling kit of embodiment 8-10, wherein the welded portion is to be roll-milled by the moving portion included in the moving device.
12. The handling kit of embodiment 1-11, wherein the tube attachment member coupled to the distal portion of the fluid outlet tube is to be moved to change tension of the fluid outlet tube in between the proximal and distal portions of the fluid outlet tube when the tube holding portion is coupled to the proximal portion of the fluid outlet tube.
13. The handling kit of embodiment 1-12, wherein the tube attachment member is to be moved by the moving device to change tension between the proximal portion and the distal portion of the fluid outlet tube.
14. The handling kit of embodiment 1-13, wherein the moving portion included in the moving device is to couple to the tube attachment member.
15. The handling kit of embodiment 1-14, wherein the moving device is to move the housing with less than 1 millimeter precision.
16. The handling kit of embodiment 1-15, wherein the docking portion includes a magnet or a metal piece.
17. The handling kit of embodiment 1-16, wherein the tube attachment member includes a magnet or a metal piece.
18. The handling kit of embodiment 1-17, wherein the moving portion included in the moving device includes an electric magnet.
19. The handling kit of embodiment 1-18, wherein the moving device further comprises a sensor.
20. The handling kit of embodiment 19, wherein the sensor is to read information from the flexible liquid bag.
21. The handling kit of embodiment 19-20, wherein the housing include a cover including a transparent portion, and wherein the sensor is to read information from the flexible liquid bag.
22. The handling kit of embodiment 19-20, wherein the housing including a cover including a transparent portion, and wherein the sensor is to read information from the flexible liquid bag through the transparent portion.
23. The handling kit of embodiment 21, wherein the flexible liquid bag comprises a label containing information, and wherein the sensor is to read information from the label.
24. The handling kit of embodiment 21-23, wherein the flexible liquid bag includes a transparent bag portion, and wherein the sensor is to read information through the transparent bag portion.
25. The handling kit of embodiment 24, wherein the sensor is to read information from the liquid contained in the flexible liquid bag through the transparent bag portion.
26. The handling kit of embodiment 25, wherein the information includes temperature, pH, oxygenation status, or any combination thereof.
27. The handling kit of embodiment 19-26, wherein the housing comprises a computer-readable indicator, and wherein the sensor is to read information from the computer-readable indicator.
28. The handling kit of embodiment 27, wherein the computer-readable indicator includes a computer readable code.
29. The handling kit of embodiment 28, wherein the computer readable code includes AprilTags, a bar code, a QR code, or a combination thereof.
30. The handling kit of embodiment 27-29, wherein the information from the computer-readable indicator is to be processed to determine an orientation of the housing with respect to the moving portion included in the moving device or a distance between the sensor and the housing.
31. The handling kit of embodiment 1-30, wherein the moving device is a robotic arm.
32. The handling kit of embodiment 31, wherein the robotic arm has at least six degrees of freedom.
33. The handling kit of embodiment 31-32, wherein the robotic arm is an UR5e robotic arm.
34. The handling kit of embodiment 1-33, wherein the platform comprises a receiving portion to receive the docking portion on a surface of the platform.
35. The handling kit of embodiment 34, wherein the receiving portion includes a surface recess.
36. The handling kit of embodiment 1-35, wherein the housing further comprises a housing receiving portion to receive another docking portion of another housing.
37. The handling kit of embodiment 36, wherein the housing receiving portion includes a surface recess.
38. The handling kit of embodiment 36-37, wherein the docking portion is to couple to a housing receiving portion of another housing to couple the housing and the other housing.
39. The handling kit of embodiment 1-37, wherein the docking portion is to couple to a housing receiving portion of another housing to stack the housing and the other housing.
40. a system for a flexible liquid bag having a fluid outlet tube to be moved by a moving device and to be cut and welded to a fluid inlet tube of a container by a tube cutting and welding device, the system comprising:
a moving device including a moving portion;
a housing sized to accept the flexible liquid bag in the housing, wherein the housing limits pressure change within the flexible liquid bag in the housing and further comprises
an attachment portion to attach the housing to the moving device,
a docking portion to dock the housing to a platform supporting the tube cutting and welding device, and
a tube holding member to hold a proximal portion of the fluid outlet tube to restrict moving of the proximal portion of the fluid outlet tube with respect to the housing; and
a tube attachment member to attach to a distal portion of the fluid outlet tube outside the housing, to restrict moving of the distal portion of the fluid outlet tube with respect to the tube attachment member.
41. The system of embodiment 40, wherein the container contains a live cultured cell.
42. The system of embodiment 40-41, wherein the tube cutting and welding device is adapted to cut and weld the fluid outlet tube of the flexible liquid bag and the fluid inlet tube of the container.
43. The system of embodiment 40-42, wherein the fluid outlet tube or the fluid inlet tube are guided by a tube guiding member to guide the fluid outlet tube or the fluid inlet tube to be placed with respect to the cutting and welding device.

44. The system of embodiment 43, wherein the tube guiding member includes a wider opening and a narrower tube accommodating portion.
45. The system of embodiment 40-44, wherein a portion of the fluid outlet tube in between the proximal and distal portions of the fluid outlet tube is to be cut by the cutting and welding device to expose of a cut portion of the fluid outlet tube connected to the distal portion and to the flexible liquid bag.
46. The system of embodiment 45, wherein the cut portion of the fluid outlet tube is to be shifted by the cutting and welding device to be aligned with a tube end of the fluid inlet tube to be welded to the tube end.
47. The system of embodiment 45, wherein the cut portion of the fluid outlet tube is to be welded by the cutting and welding device to a tube end of the fluid inlet tube connected to the container to form a welded portion of the fluid outlet tube welded to the fluid inlet tube.
48. The system of embodiment 47, wherein the moving portion included in the moving device is to contact the welded portion to increase fluid flow through the welded portion.
49. The system of embodiment 47-48, wherein the welded portion is to be pushed by the moving portion included in the moving device.
50. The system of embodiment 47-49, wherein the welded portion is to be roll-milled by the moving portion included in the moving device.
51. The system of embodiment 40-50, wherein the tube attachment member coupled to the distal portion of the fluid outlet tube is to be moved to change tension of the fluid outlet tube in between the proximal and distal portions of the fluid outlet tube when the tube holding portion is coupled to the proximal portion of the fluid outlet tube.
52. The system of embodiment 40-51, wherein the tube attachment member is to be moved by the moving device to change tension between the proximal portion and the distal portion of the fluid outlet tube.
53. The system of embodiment 40-52, wherein the moving portion included in the moving device is to couple to the tube attachment member.
54. The system of embodiment 40-53, wherein the moving device is to move the housing with less than 1 millimeter precision.
55. The system of embodiment 40-54, wherein the docking portion includes a magnet or a metal piece.
56. The system of embodiment 40-55, wherein the tube attachment member includes a magnet or a metal piece.
57. The system of embodiment 40-56, wherein the moving portion included in the moving device includes an electric magnet.
58. The system of embodiment 40-57, wherein the moving device further comprises a sensor.
59. The system of embodiment 58, wherein the sensor is to read information from the flexible liquid bag.
60. The system of embodiment 58-59, wherein the housing includes a cover including a transparent portion, and wherein the sensor is to read information from the flexible liquid bag.
61. The system of embodiment 60, wherein the flexible liquid bag comprises a label containing information, and wherein the sensor is to read information from the label.
62. The system of embodiment 60-61, wherein the flexible liquid bag includes a transparent bag portion, and wherein the sensor is to read information through the transparent bag portion.
63. The system of embodiment 62, wherein the sensor is to read information from the liquid contained in the flexible liquid bag through the transparent bag portion.
64. The system of embodiment 63, wherein the information includes temperature, pH, oxygenation status, or any combination thereof.
65. The system of embodiment 58-64, wherein the housing comprises a computer-readable indicator, and wherein the sensor is to read information from the computer-readable indicator.
66. The system of embodiment 65, wherein the computer-readable indicator includes a computer readable code.
67. The system of embodiment 66, wherein the computer readable code includes AprilTags, a bar code, a QR code, or a combination thereof.
68. The system of embodiment 65-67, wherein the information from the computer-readable indicator is to be processed to determine an orientation of the housing with respect to the moving portion included in the moving device or a distance between the sensor and the housing.
69. The system of embodiment 40-68, wherein the moving device is a robotic arm.
70. The system of embodiment 69, wherein the robotic arm has at least six degrees of freedom.
71. The system of embodiment 69-70, wherein the robotic arm is an UR5e robotic arm.
72. The system of embodiment 40-71, wherein the platform comprises a receiving portion to receive the docking portion on a surface of the platform.
73. The system of embodiment 72, wherein the receiving portion includes a surface recess.
74. The system of embodiment 40-73, wherein the housing further comprises a housing receiving portion to receive another docking portion of another housing.
75. The system of embodiment 74, wherein the housing receiving portion includes a surface recess.
76. The system of embodiment 40-75, wherein the docking portion is to couple to a housing receiving portion of another housing to couple the housing and the other housing.
77. The system of embodiment 40-75, wherein the docking portion is to couple to a housing receiving portion of another housing to stack the housing and the other housing.

Of note, the exemplar embodiments of the disclosure described herein do not limit the scope of the invention since these embodiments can be merely examples of the embodiments of the invention. Any equivalent embodiments can be intended to be within the scope of this invention. Indeed, various modifications of the disclosure, in addition to those shown and described herein, such as alternative useful combinations of the elements described, may become apparent to those skilled in the art from the description. Such modifications and embodiments can be also intended to fall within the scope of the appended claims.

What is claimed is:

1. A system for a flexible liquid bag having a fluid outlet tube to be moved by a moving device and to be cut and welded to a fluid inlet tube of a container by a tube cutting and welding device, the system comprising:
a moving device including a moving portion;

a housing sized to accept the flexible liquid bag in the housing, wherein the housing limits pressure change within the flexible liquid bag in the housing and further comprises
an attachment portion to attach the housing to the moving device,
a docking portion to dock the housing to a platform supporting the tube cutting and welding device, and
a tube holding member to hold a proximal portion of the fluid outlet tube to restrict moving of the proximal portion of the fluid outlet tube with respect to the housing; and
a tube attachment member to attach to a distal portion of the fluid outlet tube outside the housing, to restrict moving of the distal portion of the fluid outlet tube with respect to the tube attachment member.

2. The system of claim 1, wherein the container contains a live cultured cell.

3. The system of claim 1, wherein the tube cutting and welding device is adapted to cut and weld the fluid outlet tube of the flexible liquid bag and the fluid inlet tube of the container,
wherein the fluid outlet tube or the fluid inlet tube are guided by a tube guiding member to guide the fluid outlet tube or the fluid inlet tube to be placed with respect to the cutting and welding device, wherein the tube guiding member includes a wider opening and a narrower tube accommodating portion.

4. The system of claim 1, wherein a portion of the fluid outlet tube in between the proximal and distal portions of the fluid outlet tube is to be cut by the cutting and welding device to expose of a cut portion of the fluid outlet tube connected to the distal portion and to the flexible liquid bag,
wherein the cut portion of the fluid outlet tube is to be welded by the cutting and welding device to a tube end of the fluid inlet tube connected to the container to form a welded portion of the fluid outlet tube welded to the fluid inlet tube,
wherein the moving portion included in the moving device is to contact the welded portion to increase fluid flow through the welded portion.

5. The system of claim 1, wherein the tube attachment member is to be moved by the moving device to change tension between the proximal portion and the distal portion of the fluid outlet tube.

6. The system of claim 1, wherein the moving portion included in the moving device is to couplable to the tube attachment member,
wherein the tube attachment member includes a magnet or a metal piece, or
wherein the moving portion included in the moving device includes an electric magnet.

7. The system of claim 1, wherein the moving device further comprises a sensor.

8. The system of claim 7, wherein the housing includes a cover including a transparent portion, and wherein the sensor is to read information from the flexible liquid bag.

9. The system of claim 8, wherein the flexible liquid bag comprises a label containing information, and wherein the sensor is to read information from the label, or
wherein the flexible liquid bag includes a transparent bag portion, and wherein the sensor is to read information through the transparent bag portion, or
wherein the sensor is to read information from the liquid contained in the flexible liquid bag through the transparent bag portion.

10. The system of claim 9, wherein the information includes temperature, pH, oxygenation status, or any combination thereof.

11. The system of claim 7, wherein the housing comprises a computer-readable indicator, and wherein the sensor is to read information from the computer-readable indicator.

12. The system of claim 11, wherein the information from the computer-readable indicator is to be processed to determine an orientation of the housing with respect to the moving portion included in the moving device or a distance between the sensor and the housing.

13. The system of claim 1, wherein the moving device is a robotic arm, wherein the robotic arm has at least six degrees of freedom.

14. The system of claim 1, wherein the housing further comprises a housing receiving portion to receive another docking portion of another housing.

15. The system of claim 1, wherein the docking portion is to couple to a housing receiving portion of another housing to couple the housing and the other housing.

16. A handling kit for a flexible liquid bag having a fluid outlet tube to be moved by a moving device and to be cut and welded to a fluid inlet tube of a container by a tube cutting and welding device, the handling kit comprising:
a housing sized to accept the flexible liquid bag in the housing, wherein the housing limits pressure change within the flexible liquid bag in the housing and further comprises
an attachment portion to attach the housing to the moving device,
a docking portion to dock the housing to a platform supporting the tube cutting and welding device, and
a tube holding member to hold a proximal portion of the fluid outlet tube to restrict moving of the proximal portion of the fluid outlet tube with respect to the housing; and
a tube attachment member to attach to a distal portion of the fluid outlet tube outside the housing, to restrict moving of the distal portion of the fluid outlet tube with respect to the tube attachment member.

17. The handling kit of claim 16, wherein the container contains a live cultured cell.

18. The handling kit of claim 16, wherein the tube cutting and welding device is adapted to cut and weld the fluid outlet tube of the flexible liquid bag and the fluid inlet tube of the container,
wherein the fluid outlet tube or the fluid inlet tube are guided by a tube guiding member to guide the fluid outlet tube or the fluid inlet tube to be placed with respect to the cutting and welding device, wherein the tube guiding member includes a wider opening and a narrower tube accommodating portion.

19. The handling kit of claim 16, wherein a portion of the fluid outlet tube in between the proximal and distal portions of the fluid outlet tube is to be cut by the cutting and welding device to expose of a cut portion of the fluid outlet tube connected to the distal portion and to the flexible liquid bag,
wherein the cut portion of the fluid outlet tube is to be welded by the cutting and welding device to a tube end of the fluid inlet tube connected to the container to form a welded portion of the fluid outlet tube welded to the fluid inlet tube,
wherein the moving portion included in the moving device is to contact the welded portion to increase fluid flow through the welded portion.

20. The handling kit of claim 16, wherein the tube attachment member is to be moved by the moving device to change tension between the proximal portion and the distal portion of the fluid outlet tube.

21. The handling kit of claim 16, wherein the moving portion included in the moving device is to couplable to the tube attachment member,
  wherein the tube attachment member includes a magnet or a metal piece, or
  wherein the moving portion included in the moving device includes an electric magnet.

22. The handling kit of claim 16, wherein the moving device further comprises a sensor.

23. The handling kit of claim 22, wherein the sensor is to read information from the flexible liquid bag.

24. The handling kit of claim 22, wherein the housing include a cover including a transparent portion, and wherein the sensor is to read information from the flexible liquid bag.

25. The handling kit of claim 22, wherein the flexible liquid bag comprises a label containing information, and wherein the sensor is to read information from the label, or
  wherein the flexible liquid bag includes a transparent bag portion, and wherein the sensor is to read information through the transparent bag portion, or
  wherein the sensor is to read information from the liquid contained in the flexible liquid bag through the transparent bag portion.

26. The handling kit of claim 25, wherein the information includes temperature, pH, oxygenation status, or any combination thereof.

27. The handling kit of claim 22, wherein the housing comprises a computer-readable indicator, and wherein the sensor is to read information from the computer-readable indicator.

28. The handling kit of claim 27, wherein the information from the computer-readable indicator is to be processed to determine an orientation of the housing with respect to the moving portion included in the moving device or a distance between the sensor and the housing.

29. The handling kit of claim 16, wherein the moving device is a robotic arm,
  wherein the robotic arm has at least six degrees of freedom.

30. The handling kit of claim 16, wherein the housing further comprises a housing receiving portion to receive another docking portion of another housing,
  wherein the docking portion is to couple to a housing receiving portion of another housing to couple the housing and the other housing.

* * * * *